(12) United States Patent
Lutzer et al.

(10) Patent No.: US 10,899,098 B2
(45) Date of Patent: Jan. 26, 2021

(54) SYSTEM FOR COMPACTING WASTE IN A VEHICLE

(71) Applicant: Airbus Operations GmbH, Hamburg (DE)

(72) Inventors: Wilhelm Lutzer, Hamburg (DE); Matthias Reiss, Hamburg (DE); Oliver Kiehne, Hamburg (DE); Marc Spille, Hamburg (DE); Michael Kempa, Hamburg (DE)

(73) Assignee: Airbus Operations GmbH

( * ) Notice: Subject to any disclaimer, the term of this patent is extended or adjusted under 35 U.S.C. 154(b) by 190 days.

(21) Appl. No.: 16/164,552

(22) Filed: Oct. 18, 2018

(65) Prior Publication Data

US 2019/0047242 A1 Feb. 14, 2019

Related U.S. Application Data

(63) Continuation of application No. PCT/EP2017/000554, filed on May 4, 2017.

(30) Foreign Application Priority Data

May 4, 2016 (DE) .................. 10 2016 108 362

(51) Int. Cl.
*B30B 9/30* (2006.01)
*B30B 1/00* (2006.01)
*B64D 11/00* (2006.01)

(52) U.S. Cl.
CPC ............ *B30B 9/3057* (2013.01); *B30B 1/003* (2013.01); *B30B 9/305* (2013.01); *B30B 9/3017* (2013.01);

(Continued)

(58) Field of Classification Search
CPC ..... B30B 1/003; B30B 9/3007; B30B 9/3057; B30B 9/3017; B30B 9/3046;
(Continued)

(56) References Cited

U.S. PATENT DOCUMENTS 3,478,909 A * 11/1969 Charles .................... B65F 3/14
414/492
3,835,767 A 9/1974 Peterson
(Continued)

FOREIGN PATENT DOCUMENTS

CN 201300544 Y 9/2009
DE 102016108362 A1 11/2017
(Continued)

OTHER PUBLICATIONS

International Search Report, European Search Report for European Patent Application No. PCT/EP2017/000554, dated Jul. 8, 2017.

*Primary Examiner* — Jimmy T Nguyen
(74) *Attorney, Agent, or Firm* — Lerner, David, Littenberg, Krumholz & Mentlik, LLP

(57) ABSTRACT

A system for compacting waste includes a trolley and a cabin monument. The trolley or the cabin monument has a compacting device. The compacting device includes a cover with a bellows that is arranged on the lower face of the cover and is designed to be movable between a folded-together position, in which the bellows interior has a first volume, and an unfolded position, in which the bellows interior has an enlarged second volume. By suctioning fluid from a container interior formed in the trolley by means of a first cover channel arranged in the cover of the trolley, the bellows can be moved into the unfolded position such that the bellows protrudes far enough into the container interior that the waste container and/or waste in the waste container is compacted.

13 Claims, 11 Drawing Sheets

(52) U.S. Cl.
CPC .......... *B30B 9/3039* (2013.01); *B30B 9/3046* (2013.01); *B64D 11/0007* (2013.01)

(58) Field of Classification Search
CPC ....... B30B 9/3039; B30B 9/225; B30B 9/305; B30B 5/02; B65F 1/1405; B65F 1/1473; B65F 1/1426; B64D 11/04; B64D 11/0007
See application file for complete search history.

(56) References Cited

U.S. PATENT DOCUMENTS

| | | | |
|---|---|---|---|
| 3,835,769 A | | 9/1974 | Peterson |
| 4,273,037 A | | 6/1981 | Ruebesam |
| 4,444,099 A | | 4/1984 | Paleschuck |
| 5,185,007 A | * | 2/1993 | Middaugh ............... A61F 5/441 604/320 |
| 6,000,323 A | * | 12/1999 | Schlegel ................. B30B 1/003 100/211 |
| 7,007,598 B1 | * | 3/2006 | Patras ................... B30B 9/3007 100/35 |
| 2005/0072324 A1 | | 4/2005 | Paleschuck |
| 2015/0343732 A1 | * | 12/2015 | Schliwa ................. B30B 9/305 100/90 |

FOREIGN PATENT DOCUMENTS

| | | | | |
|---|---|---|---|---|
| EP | 2949459 A1 | | 12/2015 | |
| GB | 1428258 A | | 3/1976 | |
| GB | 2387527 A | * | 10/2003 | ............ B65F 1/1405 |
| WO | 2017190838 A1 | | 11/2017 | |

\* cited by examiner

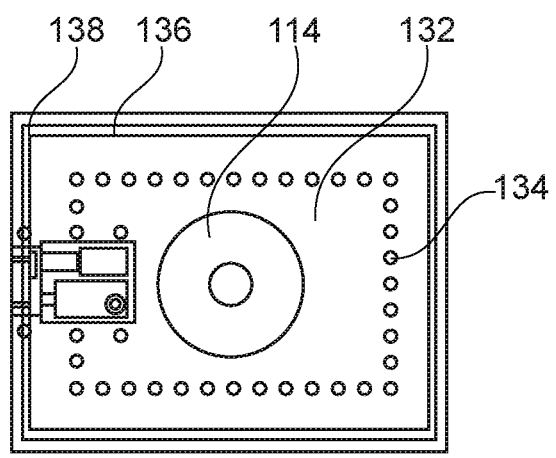
Fig. 15
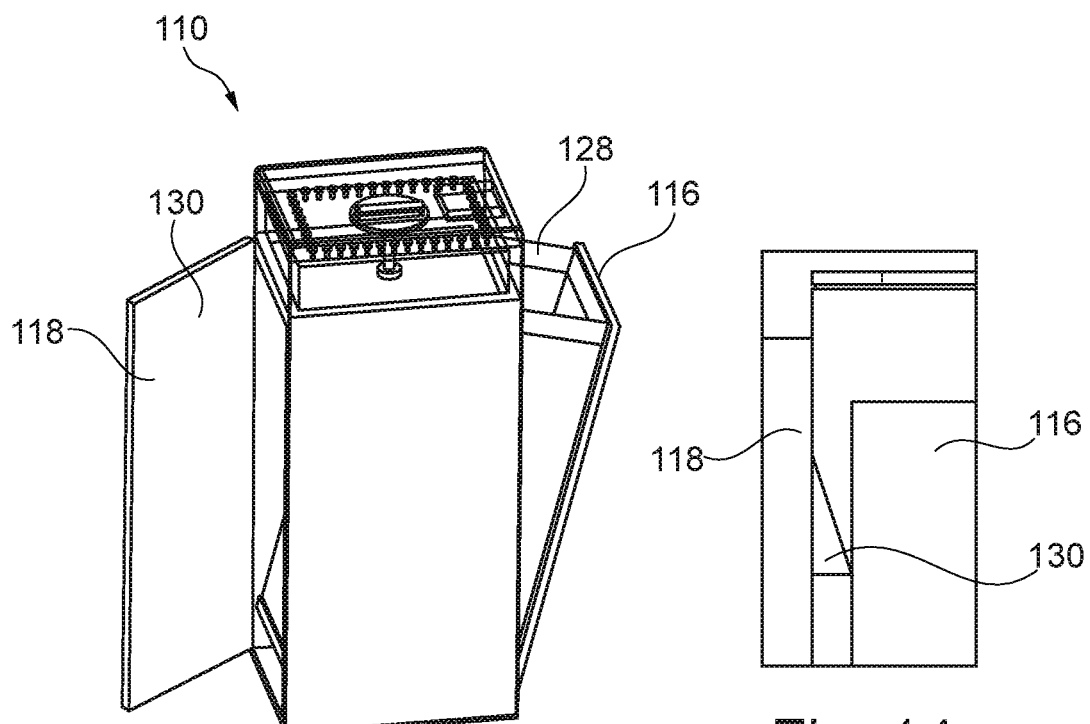
Fig. 14b
Fig. 14c

SYSTEM FOR COMPACTING WASTE IN A VEHICLE

CROSS-REFERENCE TO PRIORITY APPLICATIONS

This application is a continuation of international patent application number PCT/EP2017/000554, having an international filing date of May 4, 2017, which claims priority to German patent application number DE 10 2016 108 362.3, having a filing date of May 4, 2016. The content of the referenced applications is incorporated by reference herein.

TECHNICAL FIELD

Embodiments of the subject matter described herein relate generally to a system for compacting waste, to a trolley, and to a corresponding vehicle.

BACKGROUND

A trolley for collecting waste is used in a vehicle, in particular an aircraft. On-board vehicles which serve for transporting passengers, food and beverages are often consumed, leading to waste. Waste can thus be regarded as solid and/or liquid waste. In particular on board passenger aircraft, the waste is predominantly collected by the cabin personnel. After the end of a journey of the vehicle, the waste must be disposed of. Since it is the case at any journey destination that the disposal leads to disposal fees in each case, waste is often stored on-board the vehicle and subsequently disposed of at a home airport.

In particular in the case of vehicles for short journey distances, the cabins of the vehicles are configured for a large number of passenger seats. The vehicles therefore have only a limited capacity for storing food and beverages and an only limited capacity for storing waste. Waste may for example include paper cups, small boxes, bottles, cans and/or packets. Waste may furthermore include liquids, such as for example residues of a beverage in a can or bottle. If such waste is collected using the trolley, such waste is of a low density. This is attributed to the fact that paper cups, boxes and/or cans, for example, are not compacted after being collected, but rather still at least partially enclose air volumes, leading to a relatively large volume requirement for the collection of such waste. To be able to collect more waste in an identical available space, waste compacting systems are known from the prior art. These are designed to mechanically compact the volume of the collected waste in order to enable such compacted waste to be stored with a small volume requirement.

Patent publication EP 2 949 459 A1 has disclosed a waste compacting system. The waste compacting system comprises a trolley with an internally arranged compacting sleeve which has rigid side surfaces, wherein the compacting sleeve can be compacted by suctioning of air out of an interior space of the compacting sleeve. During the suctioning of the air, the rigid side surfaces of the compacting sleeve move toward one another in the horizontal direction, giving rise to a compacted compacting sleeve which is elongate in a vertical direction and narrow in the horizontal direction, with waste compressed therein.

For the compacting of waste using the compacting sleeve with the rigid side surfaces, it has however been identified that the air must be suctioned out of the interior space of the compacting sleeve with a particularly intense negative pressure in order to generate corresponding forces such that the rigid side surfaces move toward one another in the horizontal direction and the most intense possible compaction is realized. By contrast, if a vacuum that is provided is not sufficient, then a corresponding degree of compaction is reduced, which leads to less effective compaction of the waste.

BRIEF SUMMARY

It is an object of the disclosure to provide a system for the particularly simple and at the same time effective compaction of waste.

The object is achieved by means of a system for compacting waste having the features of independent claim 1. Advantageous configurations and preferred embodiments are defined in the associated subclaims and in the following description.

A system for compacting waste is proposed. The system has a trolley for collecting waste and has a cabin monument for a vehicle. The trolley or the cabin monument has a compacting device with a cover which has a first cover channel. The trolley has a trolley housing with a top-side housing opening. The trolley furthermore has a container with a container opening, wherein the container is inserted into the trolley housing and/or is at least partially formed by the trolley housing. Furthermore, the trolley comprises an exchangeable waste receptacle which is arranged in the container and which has a top-side receptacle opening, wherein the receptacle opening and the container opening, and possibly the housing opening, are, for the collecting of waste, arranged relative to one another such that waste can be conveyed into a receptacle interior space of the waste receptacle. Furthermore, the compacting device has a bellows which is arranged at the bottom side on the cover and which is designed to be movable at least between a folded-together position, in which a bellows interior space of the bellows has a first volume, and a folded-out position, in which the bellows interior space has a second volume which is larger than the first volume, The cover can be at least indirectly placed in connection with the container such that the bellows faces toward a container interior space of the container and the cover closes off the container interior space in air-tight fashion aside from the first cover channel, such that fluid can be suctioned out of the container interior space via the first cover channel. Furthermore, the bellows can be moved into the folded-out position by suctioning of fluid out of the container interior space via the first cover channel, such that the bellows projects into the container interior space to such an extent and the waste receptacle and/or waste in the waste receptacle can be compacted.

The trolley is preferably designed as a movable cart. The trolley may also be referred to as a cart, roller cart or transport cart. The trolley may be pulled or pushed. For this purpose, rollers may be arranged on the underside on the trolley housing, such that the trolley can be pushed or pulled on a vehicle floor, in particular on an aisle, in the cabin of the vehicle. The trolley may thus preferably be designed as a movable trolley.

The trolley furthermore has a container. The container may be designed as a separately handleable container. For this purpose, the container may be inserted into the trolley housing. The container has a container opening which is preferably aligned with the housing opening of the trolley housing. Provision may alternatively be made for the container to be formed by the trolley housing itself, at least partially itself. For example, it is thus possible for inner walls and a base of the trolley housing to be designed so as to form a corresponding container. It is pointed out at this juncture that, where the container is discussed below, the container relates to the separate variant of the container or to the variant in which the container is at least partially formed by the trolley housing.

Furthermore, a waste receptacle with a top-side receptacle opening is provided. The waste receptacle may for example be a waste bag or a waste box. The waste receptacle is preferably formed from a material which is impermeable to liquid. The material may comprise liquid-impermeable cardboard, plastic or a metallic material, for example aluminum. If the waste receptacle is produced from cardboard, this can be disposed of and recycled after being filled and compressed, which makes the handling operations for on-board personnel easier. Correspondingly, the receptacle opening may be formed by the bag opening of the waste bag or by a box opening of the waste box. It is furthermore conceivable for the waste receptacle to be formed from a combination of a box and a bag. The waste receptacle is arranged in the container. For this purpose, the waste receptacle may be inserted or placed into the container. The receptacle opening and the container opening and the housing opening are arranged relative to one another, in particular in alignment, such that, using the trolley, waste can be collected in the interior space of the waste receptacle.

Furthermore, the cabin monument or the trolley has a compacting device with a cover. Consequently, the compacting device may be assigned either to part of the trolley or of the cabin monument or to the trolley or the cabin monument. In both usage situations, the cabin monument and the trolley respectively are of analogous design and may have the same advantageous features and give rise to the same technical effects.

The cover may be designed as a plate-like, domed and/or U-shaped element. The cover is preferably formed as a rigid and/or plate-like cover. The cover has a cover channel. The cover channel is preferably formed as a fluid channel, in particular an air channel. Thus, the cover channel may for example be formed as a bore from a top side to a bottom side of the cover. The compacting device furthermore has a bellows. The bellows is arranged at a bottom side of the cover. The bellows is designed to be movable between a folded-together position and a folded-out position. The bellows is preferably connected in fluid-tight fashion to the cover. It is furthermore preferable for the bellows to have a fluid-tight casing wall and a fluid-tight base. The bellows can thus be designed to be fluid-tight, aside from a bore in the cover.

For the compaction of waste in the receptacle interior space of the waste receptacle, the cover of the compacting device is placed in connection with the container. Here, the bellows faces toward a receptacle interior space of the receptacle, or projects into the receptacle interior space of the receptacle. The cover may thus be mounted onto an opening-side edge of the container in order to be placed in connection therewith. Here, the cover closes off the receptacle interior space of the receptacle in at least substantially air-tight fashion aside from the first cover channel. At the bottom side of the cover, the first cover channel ends preferably radially to the outside of the bellows, such that fluid, in particular air, can be suctioned out of the receptacle interior space via the first cover channel.

If air is now suctioned out of the receptacle interior space via the first cover channel, then a negative pressure is generated in the receptacle interior space, which in turn gives rise to corresponding tensile forces on the bellows, which effects an unfolding of the bellows from the initially folded-together position into the folded-out position. Here, the bellows moves progressively into the receptacle interior space of the container, wherein here, the bellows impinges on the waste receptacle and/or on the waste collected in the waste receptacle. With progressive suctioning of air out of the receptacle interior space, the bellows likewise unfolds further, such that the waste and/or the waste receptacle is compressed and thus compacted by the bellows.

As a result of the corresponding vertical downward movement of the bellows, a particularly intense compaction of the waste or of the waste receptacle can be realized. Furthermore, the bellows can be used repeatedly for the purposes of compaction. It is thus possible for a renewed compaction of waste in the waste receptacle to be performed after further waste has been collected after the first compaction process. It is furthermore possible for the waste receptacle to be exchanged after a compaction process. Waste can then be collected using the new waste receptacle. In this case, too, the compaction of waste in the waste receptacle can be performed using the bellows. It is thus possible for the waste receptacle to be designed as a single-use or multi-use waste receptacle.

A further advantage can be seen in the fact that the fluid, in particular the air, is suctioned out of the receptacle interior space in order to move the bellows from the folded-together position into the folded-out position. At the same time, the suctioning of the air out of the receptacle interior space offers the advantage that no unpleasant odors escape into the surroundings during the compaction process. Rather, the air, which possibly has an unpleasant odor, is suctioned out of the receptacle interior space for the purposes of unfolding the bellows, and is conducted to a region separate from the passenger cabin. The suctioning of the air can thus give rise to a double effect, specifically the unfolding of the bellows and at the same time the odor-free discharge of air out of the receptacle interior space.

If the compacting device does not form a part of the trolley and/or is assigned not to the trolley but rather to the cabin monument, provision is made for the cabin monument to be designed to move the compacting device, in particular in a vertical direction. Provision is preferably made here for in particular the cover and the bellows arranged thereon to be movable by the cabin monument. In this way, the cover with the bellows can be moved in the direction of the trolley, specifically preferably in the direction of the container of the trolley. If the container is formed, in particular at least partially, by the trolley housing, then provision may be made for the cover with the bellows to be movable in the direction of the trolley housing, and particularly preferably in the direction of the housing opening of the trolley housing. As a result of the movement, the cover can be placed in connection with the container, or with the trolley housing, such that the cover closes off the container interior space, or the trolley housing interior space, in air-tight fashion aside from the first cover channel, such that fluid can be suctioned out of the container interior space, or the trolley housing interior space, via the first cover channel. Fluid refers preferably to gas, air and/or liquid.

If the compacting device is a part of the cabin monument, the system likewise offers the advantage that waste can be collected using the trolley. Once this has been performed, the trolley can be pushed into the receiving space, such that the compacting device of the cabin monument is arranged above the trolley. The cover can thereupon be moved together with the bellows in the direction of the trolley, such that the cover closes off the container interior space, or the trolley housing interior space, in fluid-tight fashion aside from the first cover channel. The subsequent suctioning of fluid, in particular air, out of the container interior space, or trolley housing interior space, has the effect that the bellows is moved from the folded-together position into the folded-out position, such that the bellows compacts the waste receptacle and/or waste in the waste receptacle. Once this has been performed, the bellows can be moved from the folded-out position back into the folded-together position, in order to at the same time or subsequently move the cover with the bellows back again in the direction of the cabin monument, such that the trolley can be pulled out of the receiving space again. A further collection of waste can thereupon be performed using the trolley. Before this, it is possible for the waste receptacle to be removed from the trolley and exchanged for a new waste receptacle. In these circumstances, the system therefore offers the further advantage that the trolley can be designed to be free from the compacting device. The trolley can thus have a relatively low weight and/or relatively small dimensions. This facilitates the production and the handling of the trolley.

It may be advantageous to equip the container with guide rails in which the waste receptacle can be held. The exchangeable waste receptacle may for example be inserted into a guide rail on the top side of the trolley. The guide rails are preferably designed so as to effect a slight widening of the receptacle opening, for example by means of suitable arrangement of bevels or the provision of slopes of the guide rails. It is possible in this way to prevent the bellows from impacting, during the compression process, against an edge of the waste receptacle situated at the receptacle opening. It would furthermore preferably be possible for the guide rails to terminate with the wall of the waste receptacle, in order that the bellows does not become caught on the guide rails during a movement directed toward the cover.

The guide rails may comprise multiple segments, for example a front segment, a rear segment and lateral segments. These may be arranged on a front door, a rear door and side surfaces of the trolley or of the container, or form a part thereof.

One advantageous configuration is characterized in that the first cover channel extends from a first opening at a cover top side of the cover to a second opening at a cover bottom side of the cover, wherein the second opening of the first cover channel is arranged radially to the outside of the bellows. Here, the first cover channel may be formed by a bore from the cover top side to the cover bottom side. The first cover channel may in this case extend in an axial direction, or obliquely with respect thereto, through the cover. By virtue of the second opening of the first cover channel being arranged radially to the outside of the bellows, it is possible for fluid, in particular air, to be suctioned out of the receptacle interior space of the receptacle. The first cover channel is therefore not in direct fluidic connection with the bellows interior space.

In a further advantageous configuration, the compacting device, and in particular the cover of the compacting device, is fastened in a rotatably mounted manner to the trolley housing and/or the container. It is thus possible for the compacting device or the cover of the compacting device to be pivoted in order firstly to open up the container opening, for the purposes of collecting waste in the waste receptacle, and in order secondly to place the cover in connection with the container, in particular in connection with the opening-side edge of the container, such that the container interior space is closed off in air-tight fashion aside from the first cover channel.

In a further advantageous configuration, provision is made for the compacting device, and in particular the associated cover, to be designed to be removable and/or to be detachably fastened to the trolley housing. This offers the advantage that the compacting device can be temporarily separated from the trolley and stored at some other location, such that the trolley can then be used for collecting waste. In this case, the trolley can have relatively small extent dimensions and/or a relatively low weight, which makes it easier for the trolley to be pushed and/or pulled along a cabin aisle of the vehicle in order here to collect waste in the waste receptacle. In order, after the collection of waste, to perform a compaction of the waste, the compacting device can be fastened to the trolley housing again, such that the desired compaction can thereupon be performed by means of the unfolding of the bellows. The compacting device may subsequently be removed again in order, for example, for the waste receptacle with the compacted waste to be removed from the trolley housing and replaced with a new waste receptacle.

A further advantageous configuration is characterized in that the cover and a container-opening-side edge of the container are designed such that an air-tight seal is formed when the cover is mounted onto the container-opening-side edge of the container in order to place the cover in connection with the container. For this purpose, on the bottom side of the cover, there may be arranged an encircling sealing element, such as for example an encircling sealing rubber, which abuts against the container-opening-side edge of the container when the cover is mounted onto the edge of the container. Alternatively or in addition, an encircling sealing element, such as for example an encircling rubber seal, may be arranged on the container-opening-side edge of the container, such that the cover abuts against the seal arranged on the edge of the container when the cover is placed onto the edge of the container. In both cases, a particularly air-tight seal can be formed, which prevents unpleasant air suction noises from being generated during the compaction process.

A further advantageous configuration is characterized in that a first end-side wall, averted from the cover, of the bellows is of rigid form. The first end-side wall of the bellows may form a base of the bellows. The bellows comes into contact with the waste and/or the waste receptacle by way of the first end-side wall or the base in order to compact the waste. By virtue of the first end-side wall of the bellows being of rigid form, it is possible to effectively prevent sharp waste items from the waste from causing damage to or even destroying the first end-side wall of the bellows. Furthermore, the rigid design of the first end-side wall offers the positive advantage that a vacuum which is generated as a result of the suctioning of the air out of the container interior space and which acts on the first end-side wall of the bellows an increased force is generated, which acts in a common direction toward the waste receptacle. A particularly intense compaction of the waste can thus be realized.

In one example, a casing wall of the bellows extends from the first end-side wall to the bottom side of the cover. The casing wall may have encircling fold lines, at each of which folding can take place in order to enable the bellows to be moved between the folded-together position and the folded-out position and vice versa. A second end-side wall of the bellows, situated opposite the first end-side wall of the bellows, may be at least partially formed by the cover. Alternatively or in addition, the second end-side wall of the bellows may be formed by the bellows itself.

A further advantageous configuration is characterized in that a reinforcement plate is arranged and/or formed on the first end-side wall of the bellows in order to make the bellows of rigid form at the first end-side wall. In particular, a separate reinforcement plate may be connected, in particular cohesively, to the first end-side wall and/or integrated into the first end-side wall.

A further advantageous configuration is characterized in that the cover has a second cover channel which is designed to be in fluidic connection with the bellows interior space. Provision is preferably made here for the first end-side wall of the bellows, the casing wall of the bellows and the cover to be of fluid-tight design, in particular with respect to one another, such that a bellows interior space is formed which is fluid-tight aside from the first cover channel. The second cover channel may serve as a ventilation channel for the bellows interior space. If, for example, air is suctioned out of the container interior space, such that the bellows moves from the folded-together position into the folded-out position, air can thus flow through the second cover channel into the bellows interior space in order to permit this movement with the least possible resistance. The second cover channel may thus be designed to produce a fluidic connection between the bellows interior space and ambient air. The second cover channel preferably extends in an axial direction, or obliquely with respect thereto, through the cover. The second cover channel may thus be formed in the manner of a bore. The second cover channel preferably extends from a top side of the cover to a bottom side of the cover, wherein the bottom-side opening of the second cover channel leads to the bellows interior space. It is mentioned at this juncture that the second cover channel is formed separately from the first cover channel. It is thus possible to control the movement of the bellows between the folded-in position and the folded-out position, such that air is suctioned through the first cover channel for a first movement direction and air is suctioned through the second cover channel for an opposite, second movement direction.

A further advantageous configuration is characterized in that the container interior space is divided by means of a partition into a liquids chamber and a solids chamber in which the waste receptacle is arranged, which chambers each extend as far as the container opening such that liquid can be conveyed into the liquids chamber through a liquids chamber opening region of the container opening and that solids can be conveyed into the solids chamber or the waste receptacle through a solids chamber opening region of the container opening. Provision is furthermore preferably made for the partition to have a recess in a container-opening-side end section, through which recess gas, in particular air, can flow out of the solids chamber into the liquids chamber. Furthermore, the container has a suction line which extends from a container-opening-side first line opening to a second line opening in a base-side region of the liquids chamber, wherein the first line opening of the suction line and the second opening of the first cover channel are arranged such that the second opening of the first cover channel lies at least indirectly in fluid-tight fashion on the first line opening when the cover is placed in connection with the container, such that a fluidic connection is formed between the first cover channel and the suction line. The configuration of the trolley discussed above permits separate collection of liquid waste and solid waste. It is thus for example possible for liquid residues from a bottle or a can to be conveyed into the liquids chamber. The can itself, or other solid waste, can be conveyed into the waste receptacle. Here, the partition prevents the abovementioned types of waste from being mixed. After waste has been collected using the trolley, the cover of the compacting device is placed in connection with the container such that the cover closes off the container interior space in fluid-tight fashion aside from the first cover channel. At the bottom side of the cover, the cover channel ends at the associated second opening. Said second opening is in this case arranged opposite the first line opening of the suction line. Furthermore, the arrangement of the second opening of the first cover channel and of the first line opening of the suction line is such that a fluid-tight seal is formed between said openings when the cover is placed in connection with the container. Here, the second opening of the first cover channel may lie directly on the first line opening of the suction line. Provision may alternatively be made for an encircling, in particular ring-shaped, sealing element, such as a rubber seal, to be arranged at the second opening of the first cover channel and/or at the first line opening of the suction line. A particularly fluid-tight seal can thus be formed when the cover is mounted on the container. By means of the corresponding fluidic connection between the first cover channel and the suction line, it is ensured that firstly liquid is suctioned out of the liquids chamber. Here, the liquid flows through the second line opening in the base-side region of the liquids chamber into the suction line, and subsequently through the first cover channel. The suctioned liquid can thereupon be collected in a container provided for this purpose. If the liquid has been at least substantially suctioned out of the liquids chamber, suctioning of air out of the liquids chamber occurs. The liquids chamber is connected to the solids chamber by the recess in the partition. Therefore, the suctioning of air out of the liquids chamber also causes air to be suctioned out of the solids chamber. Both during the suctioning of liquid out of the liquids chamber and during the subsequent suctioning of air as discussed above, a vacuum is generated in the container interior space, which has the effect that the bellows is moved from the folded-together position into the folded-out position in order to realize the desired compaction of the waste or of the waste receptacle. This configuration of the trolley offers the advantage that the first cover channel can be used both for suctioning liquid out of the liquids chamber and for realizing a compaction of the solid waste in the waste receptacle.

In a further advantageous embodiment, the cover has a maintenance opening which can be closed in air-tight fashion by means of a maintenance flap. In this way, for example in the event of a malfunction of the compacting device, maintenance can be performed on the relevant components of the compacting device. For example, an end-side wall of the bellows may, on an inner side, that is to say facing toward the cover, have a handle for pulling the end-side wall toward the cover.

It may furthermore be advantageous to integrate a return device by means of which the end-side wall can be manually brought back into an upper position, that is to say directed toward the cover. The return device may for example comprise a cable pull or similar means.

The compacting device may furthermore have a holding device with which the end-side wall of the bellows can be placed in connection in order to enable the end-side wall to remain in the upper position. Magnetic or mechanical holding or snap-action devices, for example, are expedient here. When an adequate negative pressure is applied, the end-side wall can be released from this holder by the force directed away from the cover. It may be expedient, in the case of the magnetic holding device being realized, to provide a magnet with a holding force of up to approximately 500 N, which is arranged at a top side of the trolley, for example on the inner side of the cover. This may also include an installation position on the abovementioned maintenance flap. To generate a magnetic action, the end-side wall may be equipped with a magnetic holding plate as a counterpart to the magnet. It could also be advantageous for the installation position of the magnet to be determined by means of a height-adjustable holder, for example a threaded rod with a locknut. To realize the mechanical snap-action device, it may be expedient to use a snap-action ball device. This may comprise a spring-based snap-action device which can releasably hold a ball or a similar object. A corresponding spring force could then be adjusted by means of an adjustment device, for example a screw.

As mentioned above, the first cover channel permits the suctioning of air out of the receptacle interior space, whereas the second cover channel permits the inflow of air into the bellows interior space by fluidic connection with ambient air. To prevent the first or the second cover channel from being closed off or blocked, corresponding openings to the receptacle interior space or the bellows may be equipped with a grating, a screen, a cover with multiple passage holes, or the like. It would for example be expedient to use a cover similar to a top-hat rail with distributed openings which are directed to multiple sides. In the case of such a measure on the first cover channel, it is additionally possible to prevent flames, in the event of a fire within the receptacle, from being able to pass into the line adjoining the first cover channel. Instead of the use of a single second cover channel or a single opening from the bellows interior space to the surroundings, provision may also be made of multiple openings which are distributed over the cover.

To prevent the ingress of liquids or small parts into a line adjoining the first cover channel, which could impair the valve mechanism situated downstream, a filter and/or a liquid separator may additionally be expedient. The filter and/or the liquid separator should preferably be arranged between the first cover channel and a coupling connector in order for a quick-action coupling, which may be provided for this purpose, to be protected against contamination or liquids.

The first cover channel may furthermore be integrated into the cover and extend between multiple openings which are distributed over the cover.

It is furthermore advantageously possible for a preferably encircling radial brush seal to be arranged on the end-side wall of the bellows. An encircling brush seal is intended to prevent material from passing behind the end-side wall during the compaction process.

A smooth wall of the waste receptacle may additionally reduce the friction arising owing to the bellows. This may be realized for example by means of a Teflon coating or the like.

Furthermore, the bellows may, by means of at least one linear guide, for example a telescopic linear guide, protect the end-side wall against a tilting movement in the event of non-uniform compaction. Additionally, a guide prevents damage to the waste receptacle as a result of an undefined movement. The at least one linear guide could be installed on the inner side of the bellows. The linear guide may be designed in the manner of a drawer guide or a ball-rail-type pull-out mechanism.

It is advantageous for the bellows to be provided with one or more of the following further characteristics in order to yet further improve the function. For example, it is advantageous for the bellows to be designed to be exchangeable by means of a quick-action fastener, preferably in conjunction with a slot. The bellows may furthermore exhibit a certain dimensional stability through suitable material selection and design. At the same time, said bellows should however also be compressible into a relatively flat form, which leads inter alia to a maximization of the available waste volume. The bellows must exhibit adequate durability even under fluctuating mechanical load, and in particular exhibit resistance to chemical cleaning agents.

In one advantageous embodiment, the cabin monument has the compacting device, under which there is arranged a receiving space for the trolley, such that the trolley can be placed in the receiving space, and wherein the compacting device is designed to move the cover with the bellows in the direction of the trolley when the trolley has been placed in the receiving space, such that the cover is at least indirectly placed in connection with the container such that the bellows faces toward a container interior space of the container and the cover closes off the container interior space in air-tight fashion aside from the first cover channel, such that fluid can be suctioned out of the container interior space via the first cover channel.

According to a further aspect of the disclosure, the object stated in the introduction is achieved by means of a further system for compacting waste. Said system has a trolley with compacting device, wherein the cabin monument has a receiving space for the trolley, such that the trolley can be placed in the receiving space, wherein the compacting device has a first coupling connector which is designed to be in fluidic connection with the first cover channel, and wherein the cabin monument has a first coupling counterpart connector which is designed to be detachably couplable to the first coupling connector in order to produce a fluidic connection between the first coupling connector and the first coupling counterpart connector, such that fluid can be suctioned out of the container interior space via the first coupling counterpart connector.

The system with this construction offers the advantage that the fluid can be suctioned out of the container interior space via the coupling counterpart connector. If the trolley is pushed into the receiving space of the cabin monument, provision is preferably made here for the first coupling connector and the coupling counterpart connector to automatically connect to one another. Provision is therefore preferably made for the first coupling connector and the first coupling counterpart connector to be arranged such that a coupling between the two connectors takes place automatically when the trolley is placed, in particular pushed, into the receiving space. Furthermore, the trolley and the cabin monument may have elements designed correspondingly to one another, which elements are designed for arresting and/or fixing the trolley in the receiving space. Accordingly, the cabin monument may for example be assigned a rotatable lever which, when the trolley is placed into the receiving space, can be rotated such that the trolley is prevented from being able to be pulled out of the receiving space, but rather is held in the receiving space. This ensures that the possibly automatically produced coupling between the first coupling connector and the first coupling counterpart connector is not inadvertently disrupted. Provision is furthermore preferably made for the first coupling counterpart connector to be connected and/or connectable, at least indirectly, to a fluid suction device, in particular a vacuum source, such that the fluid, in particular air, can be suctioned out of the container interior space via the first coupling counterpart connector, the first coupling connector and the first cover channel out of the container interior space.

A likewise advantageous configuration of the system is characterized in that the compacting device of the trolley has a second coupling connector which is designed to be in fluidic connection with the second cover channel, wherein the cabin monument has a second coupling counterpart connector which is designed to be detachably couplable to the second coupling connector in order to produce a fluidic connection between the second coupling connector and the second coupling counterpart connector, such that air can be suctioned out of the bellows interior space via the second coupling counterpart connector. As analogously discussed above for the first coupling connector and the first coupling counterpart connector, provision is preferably made for the second coupling connector and the second coupling counterpart connector to be designed and/or arranged such that an automatic coupling between the second coupling connector and the second coupling counterpart connector takes place when the trolley is placed, in particular pushed, into the receiving space. Accordingly, provision may be made for the second coupling connector to be designed analogously to the first coupling connector, and for the second coupling counterpart connector to be designed analogously to the first coupling connector. By means of a coupling of the second coupling connector to the second coupling counterpart connector, it is ensured that air can be suctioned out of the bellows interior space. For this purpose, the cabin monument may be assigned an air suctioning unit, in particular a vacuum source, which is connected and/or connectable at least indirectly to the second coupling counterpart connector. As a result of air being suctioned out of the bellows interior space, the bellows can be moved from the folded-out position back into the folded-together position. This is because, as air is suctioned out of the bellows interior space, a negative pressure is generated in the bellows interior space, which negative pressure also acts on the first end-side wall of the bellows, that is to say preferably the base region of the bellows, such that, on the basis of a correspondingly generated force, the casing wall of the bellows can be caused to be folded together.

One advantageous configuration of the system is characterized in that the cabin monument has a controllable multi-way valve, a first inlet of the multi-way valve is at least indirectly couplable to a vacuum source, a first outlet of the multi-way valve is designed to be in fluidic connection with the first cover channel or with the first coupling counterpart connector, a second outlet of the multi-way valve is designed to be in fluidic connection with the second cover channel or with the second coupling counterpart connector, and in that the multi-way valve is controllable so as to suction fluid out of either the bellows interior space or the container interior space by means of the vacuum source, such that the bellows is moved between the folded-together position and the folded-out position, or vice versa.

By virtue of the first inlet of the multi-way valve being connected at least indirectly to the vacuum source, a corresponding vacuum can be applied selectively to the first outlet or to the second outlet. The multi-way valve can be controlled correspondingly for this purpose. Provision may furthermore be made for the multi-way valve to be controllable such that the first inlet is connected to neither of the two outlets. In this case, a corresponding vacuum is applied to neither of the outlets. The vacuum source may be assigned to the system. It is alternatively possible for the vacuum source to be arranged at some other location, in particular in the vehicle, and for the first inlet of the multi-way valve to be connected, at least indirectly, to the vacuum source by means of a fluidic connection. If the multi-way valve is controlled such that the first inlet is in fluidic connection with the first outlet, provision may be made for the first cover channel to be at least indirectly connected to the vacuum source. Thus, fluid, in particular air, is suctioned out of the container interior space, or the housing interior space, if the cover of the compacting device is connected to the container, or to the trolley housing, such that a fluid-tight seal is formed in between. As a result of the suctioning of the fluid, in particular the air, out of the container interior space, or the housing interior space, the bellows is moved from the folded-together position into the folded-out position, such that the waste receptacle and/or waste in the waste receptacle is compacted. The multi-way valve can thereupon be controlled such that the first inlet is in fluidic connection with the second outlet of the multi-way valve. In this case, the vacuum can be applied to the second cover channel, such that air is suctioned out of the bellows interior space, which gives rise to an oppositely directed movement of the bellows, such that the latter is moved back from the folded-out position into the folded-together position. If the first outlet is designed to be in fluidic connection with the first coupling counterpart connector and the second outlet is designed to be in fluidic connection with the second coupling counterpart connector, the above-stated process can take place analogously if the first coupling counterpart connector is coupled to the first coupling connector and the second coupling counterpart connector is coupled to the second coupling connector in order to produce corresponding fluidic connections. The above-discussed action on the bellows and the discussed movement of the bellows can then take place analogously to the discussion above. The above-discussed configuration of the system thus offers the advantage that the movement of the bellows is controllable by means of the controllable multi-way valve. Provision is preferably made for the controllable multi-way valve to be designed in the manner of a three/two-way valve.

A further advantageous configuration of the system is characterized in that the multi-way valve has a second inlet which is at least indirectly coupled to ambient air, wherein the multi-way valve is at least controllable such that the first inlet is coupled to the first outlet and the second inlet is coupled to the second outlet, or such that the first inlet is coupled to the second outlet and the second inlet is coupled to the first outlet.

The abovementioned ambient air is in this case in particular the air surrounding the multi-way valve or the system. It is thus possible for the second inlet to be arranged for example at an outer side of the multi-way valve and/or an outer side of the compacting device. By virtue of the multi-way valve having the second inlet, it is for example possible for the second outlet of the multi-way valve to be coupled via the second inlet to the ambient air. Here, if the first outlet is coupled indirectly to the first inlet and thus for example to the vacuum source, it is thus possible for fluid to be suctioned out of the container interior space or the trolley housing interior space, such that the bellows moves from the folded-together position into the folded-out position. Here, the volume of the bellows interior space is enlarged. To prevent a negative pressure from arising in the bellows interior space, the ambient air can flow through the second inlet of the multi-way valve and then through the second outlet to the second cover channel, which is connected to the interior space of the bellows. It is thus possible for air to flow out of the surroundings into the interior space of the bellows when the bellows moves from the folded-together position into the unfolded position. This effectively prevents the bellows from being impeded from performing the abovementioned movement.

By contrast, if the second inlet of the multi-way valve is coupled to the first outlet of the multi-way valve, and the first inlet of the multi-way valve is coupled to the second outlet of the multi-way valve, then a negative pressure acts on the interior space of the bellows if the first inlet of the multi-way valve is coupled at least indirectly to the vacuum source. So as not to impede the movement of the bellows from the folded-out position into the folded-together position, ambient air can flow through the second inlet of the multi-way valve and then through the first outlet of the multi-way valve to the first cover channel, such that the air can thereupon flow into the container interior space, or the housing interior space, such that the bellows is not impeded from performing the abovementioned movement. The controllable multi-way valve is preferably designed in the manner of a four/two-way valve. The multi-way valve can thus preferably be controllable such that none of the inlets is coupled to any of the outlets.

A further advantageous configuration of the system is characterized in that the cabin monument is assigned a controllable main valve which is couplable to a vacuum source of the vehicle, and wherein the controllable valve is designed to be in fluidic connection with the first inlet of the multi-way valve. The controllable main valve offers the advantage that the vacuum source can preferably be designed as a constant vacuum source. It is thus for example possible for a vacuum to be provided continuously by the vacuum source of the vehicle. If said vacuum is required for moving the bellows, then it is possible through control of the main valve for the vacuum to be transmitted to the controllable multi-way valve such that a vacuum is applied to the first inlet of the controllable multi-way valve for example only when this is required for moving the bellows.

Furthermore, the object stated in the introduction is achieved by means of a vehicle, in particular an aircraft, which has at least one system according to the disclosure as per the preceding description.

Finally, the object is achieved by means of a trolley for use in a system as discussed above. Here, the above-stated features of a trolley with or without an integrated compacting device form embodiments of the trolley.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Further features, advantages and possible uses of the present disclosure will emerge from the following description of the exemplary embodiments and from the figures. Here, all of the features described and/or illustrated in the figures form the subject matter of the disclosure individually and in any desired combination, even independently of the combination of said features in the individual claims or the back-references thereof. Furthermore, in the figures, the same reference designations are used for identical or similar objects.

FIGS. 13 to 15 show a further embodiment of the trolley in different illustrations.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
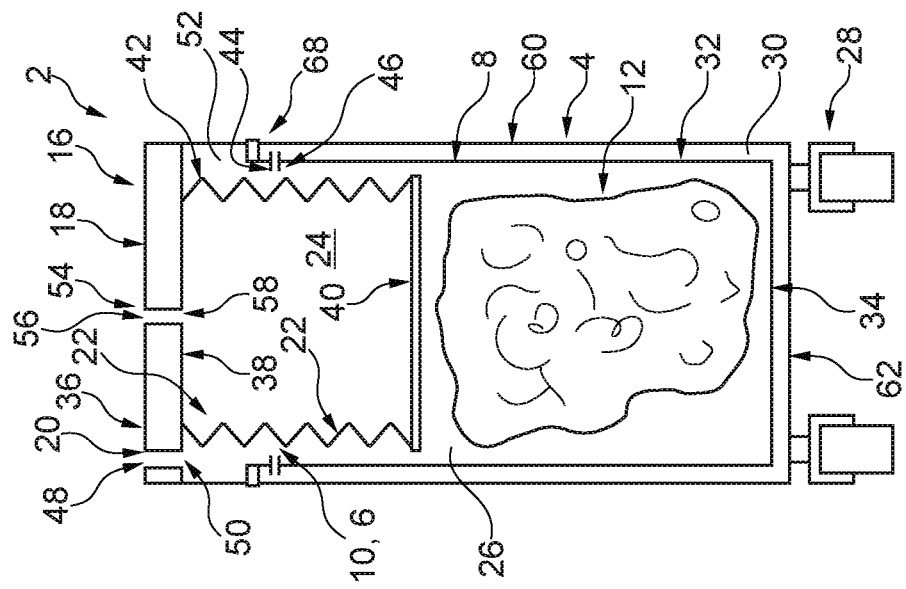
FIGS. 1 to 7 show exemplary configurations of the trolley of a system according to an embodiment of the invention in schematic cross-sectional views.

FIG. 1 shows a trolley 2 in a schematic cross-sectional view. The trolley 2 serves for the collecting of waste. For this purpose, the trolley has a trolley housing 4. The trolley housing 4 has a top-side housing opening 6. Rollers 28 are attached to the bottom side of the trolley housing 4, such that the trolley 2 can be pushed or pulled. A container 8 is inserted into a housing interior space 30 formed by the trolley housing 4. The housing interior space 30 is also referred to as a trolley housing interior space 30. The container 8 is preferably designed as a metal container or as a plastics container. The side walls 32 and the base 34 of the container 8 can thus be fluid-tight. At a side of the container 8 situated opposite the base 34, a container opening 10 is provided.

To receive waste, an exchangeable waste receptacle 12 is arranged in the container 8. The waste receptacle 12 may for example be a waste bag or a waste box. The waste receptacle 12 has a top-side receptacle opening 14. Here, the waste receptacle 12 is inserted into the container 8 such that the receptacle opening 14 and the container opening 10 are arranged in alignment with one another. Provision is furthermore made for the receptacle opening 10 and the housing opening 6 of the trolley housing 4 to be in alignment with one another. It is thus possible for waste to be introduced into the waste receptacle 12 through the housing opening 6, the container opening 10 and the receptacle opening 14.

To collect waste, the trolley 2 may for example be pushed along a cabin aisle of a vehicle, with waste taken from passengers being introduced into the waste receptacle 12 in the manner discussed above. In practice, it has been found that waste collected in this way exhibits a low density in the waste receptacle. This is because cans and/or empty packages, for example, enclose an air volume, which leads to a correspondingly low density of the waste in the waste receptacle 12.

To compact the waste in the waste receptacle 12, a compacting device 16 is provided for the trolley 2. The compacting device 16 may be detachably connected to the trolley housing 4. The compacting device 16 may thus for example form an integral part of a trolley housing cover. Provision may furthermore be made for the compacting device 16 to be handleable separately, such that the connection of the compacting device 16 to the rest of the trolley 2, in particular to the trolley housing 6, is produced only when required. Provision may furthermore be made for the compacting device 16 to be connected in a pivotably mounted manner to the trolley housing 4. Provision may furthermore be made for the compacting device 16 to be displaceable in a transverse direction by means of a linear guide of the trolley, such that the compacting device 16 projects laterally beyond the trolley housing 4, such that the housing opening 6 of the trolley housing 4 is thus accessible. Furthermore, the linear guide may be designed, and/or a further joint may be provided, to pivot the compacting device 16 downward, such that the compacting device 16 can be arranged laterally on the trolley housing 4. To perform a compaction of the waste or of the waste receptacle 12 when required, the compacting device 16 can be pivoted back again and slid back again by means of the linear guide, such that the compacting device 16 is again seated on top of the trolley housing 4 in order to then perform the stated compacting of the waste or of the waste receptacle 12. If the rotationally, pivotably and/or longitudinally displaceable connection, discussed above, between the trolley housing 4 and the compacting device 16 is not provided, the compacting device 16 may also be temporarily stored at some other location if it is temporarily not being used.

The compacting device 16 has a cover 18. The cover 18 may for example have a plate-like or U-shaped cross section. The cover 18 furthermore has a first cover channel 20. Here, the cover channel 20 extends from a top side 36 of the cover 20 to a bottom side 38 of the cover 18. The first cover channel 20 may be designed as a channel for conducting fluid, in particular air and/or liquid.

Furthermore, the compacting device 16 has a bellows 22 which is arranged at the bottom side on the cover 18. The bellows 22 is thus connected to the bottom side 38 of the cover 18. The bellows 22 has a first end-side wall 40 averted from the cover 18. The first end-side wall 40 of the bellows 22 may be of rigid form. For this purpose, the end-side wall 40 of the bellows 22 may be formed from a metal and/or from a fiber-reinforced plastic. Provision may furthermore be made for a rigid reinforcement plate, in particular composed of metal and/or of a fiber-reinforced plastic, to be arranged on the first end-side wall 40 of the bellows 22. Here, the rigid reinforcement plate may at least partially jointly form the first end-side wall 40 of the bellows. A second end-side wall, situated opposite the first end-side wall 40, of the bellows 22 may be designed at least substantially analogously to the first end-side wall 40. It is however preferable for the second end-side wall of the bellows 22 to be formed by the cover 18. Furthermore, the bellows 22 has an in particular cylindrical casing wall 42 which extends from the first end-side wall 40 to the bottom side 38 of the cover 18. The casing wall 42 is preferably of pleated design. Here, the casing wall 42 need not necessarily have a circular cross section. Other cross sections are likewise conceivable. The casing wall 42 preferably has a multiplicity of fold lines which are spaced apart from one another in an axial direction A of the bellows 22. At the fold lines, the casing wall can be folded, such that the casing wall 42 is designed such that it can be folded apart and folded together in the axial direction A. Provision is furthermore made for the first end-side wall 40 and the casing wall 42 of the bellows 22 to be of fluid-tight, in particular air-tight, design. Furthermore, the bellows 22 is connected in fluid-tight fashion to the cover 18.

Figure 2:
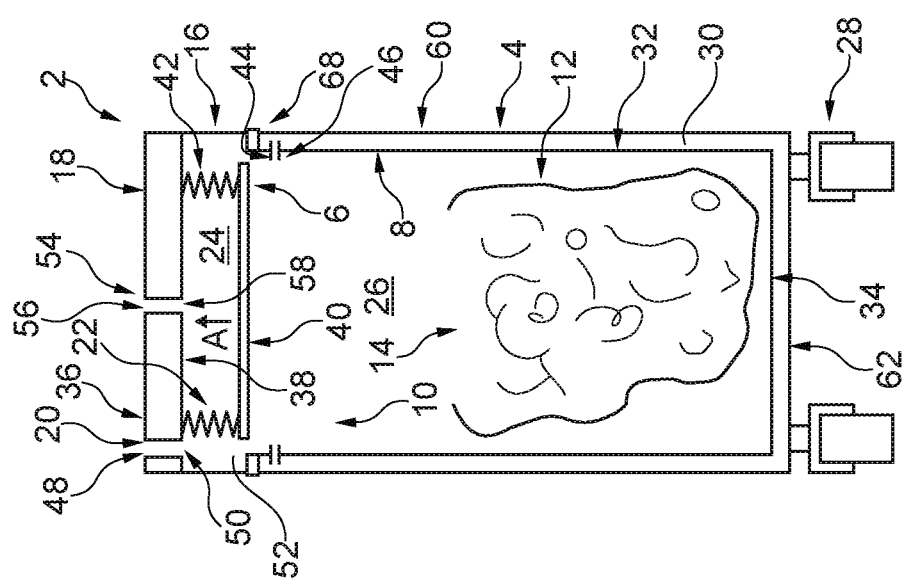
Figure 3:
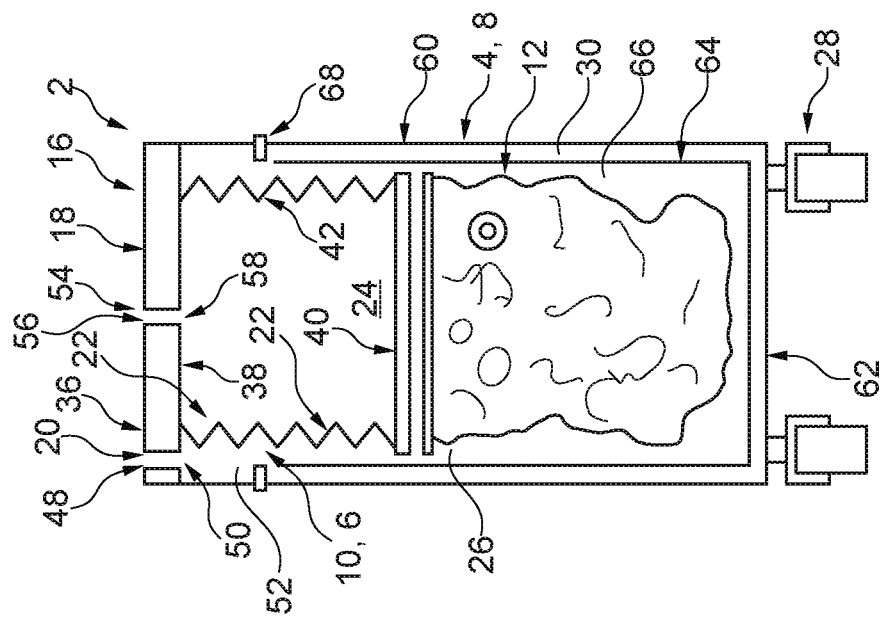

The above-discussed configuration of the bellows 22 offers the advantage that the bellows 22 is movable between a folded-together position, which is shown in FIG. 1 and in which a bellows interior space 24 of the bellows 22 has a first volume, and a folded-out position, which is shown for example in FIG. 3 and in which the bellows interior space 24 has a second volume which is larger than the first volume. As can be seen from FIG. 2, the abovementioned positions of the bellows are however merely two of a multiplicity of possible positions that the bellows 22 can assume. The bellows interior space 24 preferably means the space which is enclosed by the bellows 22, and preferably the cover 18.

For the compaction of waste in the waste receptacle 12 and/or for the compaction of the waste receptacle 12 itself, the cover 18 is placed in at least indirect connection with the container 8 such that the bellows 22 faces toward the receptacle interior space 26 of the container 8 and the cover 18 closes off the receptacle interior space 26 in air-tight fashion aside from the first cover channel 20. For this purpose, the compacting device 16 may be mounted with the cover 18 onto the top side of the trolley housing 4. The cover 18 may have an encircling sealing seat 44 which, during the mounting of the compacting device 16, is placed in connection with a top-side edge 46 of the container 8 such that an air-tight seal forms between the sealing seat 44 and the edge 46. On the sealing seat 44 and/or on the edge 46, there may be arranged an encircling sealing means, for example a rubber seal, in order that said seal is particularly air-tight.

Provision is furthermore made for the first cover channel 20 to extend from a first opening 48, preferably at the cover top side 36, of the cover 18 to a second opening 50 at the cover bottom side 38 of the cover 18, wherein the second opening 50 of the first cover channel 20 is arranged radially to the outside of the bellows 22. This prevents the first cover channel 20 from being in fluidic connection, or air connection, with the bellows interior space 24. Rather, the first cover channel 22 is in fluidic connection with an interior space 52, which is radially to the outside of the bellows 22. By means of the air-tight connection between the cover 18 and the container 8, the intermediate space 52 is connected to the container interior space 26 of the container 8. By contrast, the bellows interior space 24 is separated by the bellows 22 from the intermediate space 52 and from the container space 26. If fluid, in particular air, is now suctioned out via the first cover channel 20, air flows out of the intermediate space 52 and out of the container interior space 26 through the first cover channel 20. The pressure in the container interior space 26 thus falls. A corresponding negative pressure acts in particular on the first end-side wall 40 of the bellows 22, which gives rise to a corresponding force on the first end-side wall 40 in the direction of the container interior space 26. The casing wall 42 of the bellows 22 can unfold, such that the above-discussed action of force on the first end-side wall 40 causes a downward movement of the first end-side wall 40 of the bellows 22 in the direction of the waste receptacle 12. In other words, the bellows 22 can be moved into the folded-out position by suctioning of fluid out of the receptacle interior space 26 via the first cover channel 20, such that the bellows 22 projects into the receptacle interior space 26 to such an extent that the waste receptacle 12 and/or the waste in the waste receptacle 12 is compacted. As is schematically illustrated in FIG. 2, the waste receptacle 12 may be closed beforehand, such that the first end-side wall 40 of the bellows 22 firstly impinges on the waste receptacle 12. If the suctioning of the fluid out of the receptacle interior space 26 is continued, the first end-side wall 40 of the bellows 22 presses against the waste receptacle 12 and against the waste accommodated therein, which causes a compression or compaction of the waste receptacle 12 and of the waste accommodated therein. A correspondingly compacted waste receptacle 12 or correspondingly compacted waste in the waste receptacle 12 is schematically shown in FIG. 3.

As can be seen from FIGS. 1 to 3, the bellows interior space 24 increases in size when the bellows 22 is moved from the folded-together position, as is schematically shown in FIG. 1, into the folded-out position, as illustrated in FIG.

3. To permit unfolding of the bellows 22 with particularly free movement, provision is preferably made for the cover 18 to have a second cover channel 54 which is designed to be in fluidic connection with the bellows interior space 24. Here, the second cover channel 54 is not designed to be in fluidic connection with the intermediate space 52. Provision is rather made for the second cover channel 54 to produce a fluidic connection between the bellows interior space 24 and ambient air for the purposes of unfolding the bellows 22. If the unfolding of the bellows 22 now takes place, ambient air can flow through the second cover channel 54 into the bellows interior space 24, such that the volume of the bellows interior space 24 can increase. The second cover channel preferably extends from an associated first opening 56 at the top side 36 of the cover 18 to a second opening 58 at the bottom side 38 of the cover 18. The second opening 58 of the second cover channel 54 in this case produces the connection to the bellows interior space 24. The bellows interior space 24 is preferably designed to be fluid-tight, in particular air-tight, aside from the second cover channel 54.

By means of the connection of the second cover channel 56 to the bellows interior space 24, it is possible for the bellows 22 to be moved back into the folded-together position by suctioning of air out of the bellows interior space 24. For this purpose, the first cover channel 20 may be connected, at least indirectly, to ambient air. If the air is now suctioned out of the bellows interior space 24, a negative pressure is generated in the bellows interior space 24, which gives rise to a force on the first end-side wall 40 of the bellows 22 in the direction of the cover 8. The first end-side wall 40 thus moves, owing to said force, in the direction of the cover 18, causing the casing wall 42 to be folded together. If sufficient air has been suctioned out of the bellows interior space 24, the folded-in position of the bellows 22, as shown in FIG. 1, is attained again. In summary, it can thus be stated that, by suctioning of fluid through the first cover channel 20 or through the second cover channel 54, a movement of the bellows 22 can be controlled, specifically preferably at least between the folded-together position and the folded-out position, or vice versa.

A negative pressure for the suctioning of the abovementioned fluid may be provided by a negative-pressure source. Furthermore, a controllable valve may be provided, wherein an inlet port of the controllable valve is connected at least indirectly to the negative-pressure source, and wherein the controllable valve has two outlets, which are connected in each case to one of the cover channels 20, 54. The controllable valve may then be controlled such that either the first cover channel 20 or the second cover channel 54 is charged with a negative pressure. This causes the corresponding movement of the bellows 22. Here, provision is preferably made for the controllable valve to couple in each case that cover channel 20, 54 at which the negative pressure is not intended to prevail to ambient air.

Figure 4:
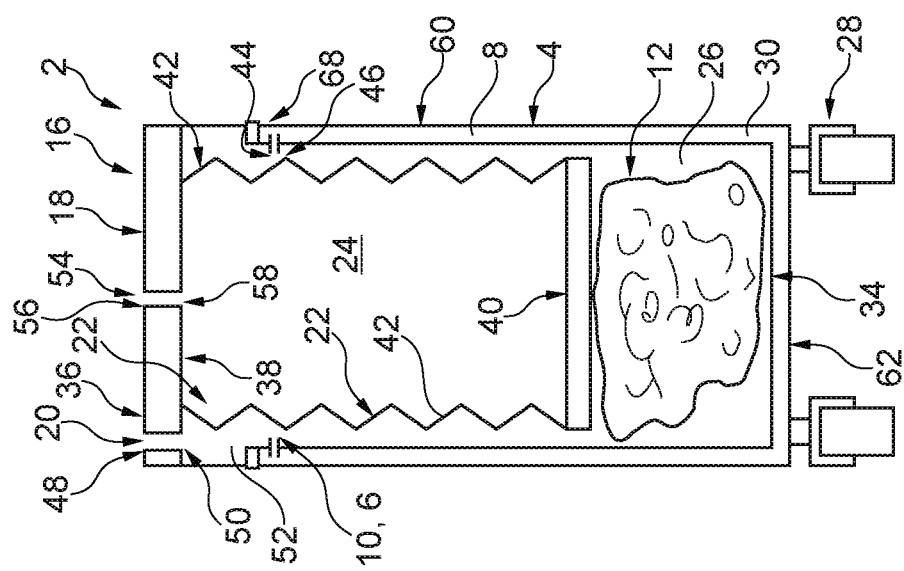

In particular with regard to FIG. 1, it has been discussed that the container 8 is inserted into the trolley housing interior space 30 and that, during the mounting of the compacting device 16, a fluid-tight connection is generated between the cover 18 and the container 8, such that the intermediate space 52 is connected to the container interior space 26 in order to suction fluid out of the container interior space 26 through the first cover channel 20. In a further advantageous configuration, as is schematically illustrated in FIG. 4, provision may however also be made to dispense with the direct air-tight connection between the cover 18 and the container 8. This is because the trolley housing 4 can preferably be of air-tight design. For this purpose, the corresponding side walls 60 and the base 62 of the trolley housing 4 may be of air-tight design and correspondingly connected to one another. The trolley housing 4 can thus form the container 8. In this case, a separate container is therefore not required. Reference is made analogously to the discussions above relating to FIGS. 1 to 3, wherein it is to be assumed here that the container 8 is formed by the trolley housing 6. In particular, in this case, the trolley housing interior space 24 forms the receptacle interior space 26.

To prevent liquids that possibly escape from the waste receptacle 12 from coming into direct contact with the trolley housing 4, a collecting trough 64 may be arranged in the trolley housing 4. Said collecting trough 64 may be arranged in the trolley housing interior space 30 such that the waste receptacle 12 is arranged in the interior space formed by the collecting trough 64. Although the waste receptacle 12 is indeed initially arranged in the interior space 66 formed by the collecting trough, this is however also intended to mean that the waste receptacle 12 is arranged in the trolley housing interior space 24.

Figure 5:
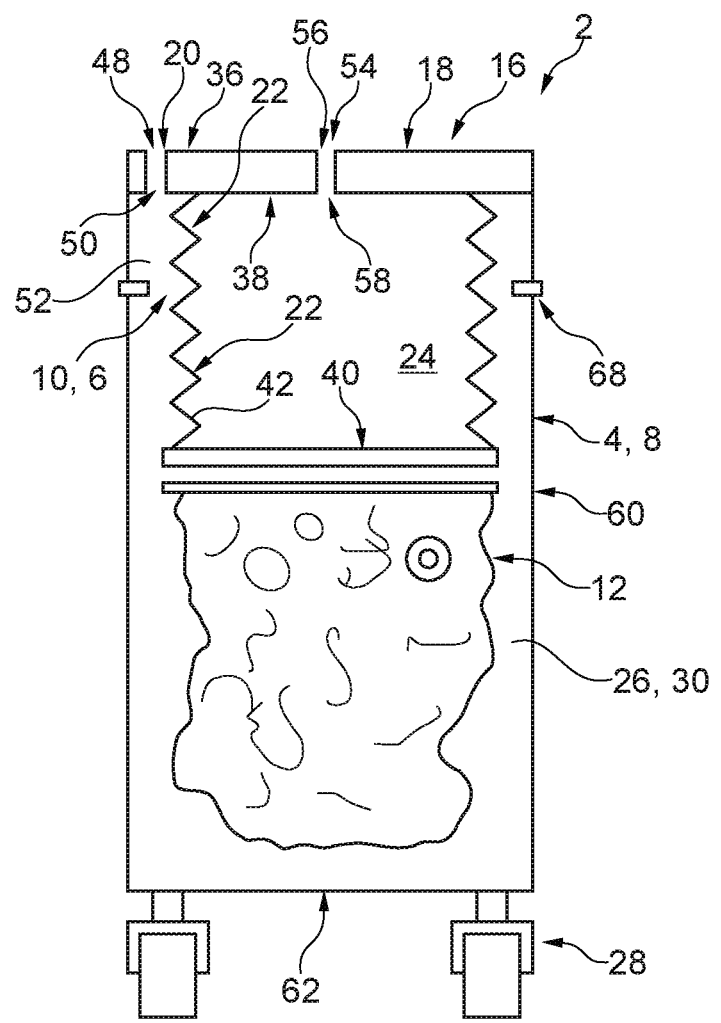

In a further advantageous configuration, as is schematically shown in FIG. 5, it is furthermore possible for the collecting trough 64 to be dispensed with. Reference is otherwise made analogously to the explanations relating to FIG. 5.

With regard to the two configurations mentioned above, it is also pointed out that the cover 18 produces an air-tight connection to the top-side edge of the trolley housing 68 when the compacting device 16 is placed in connection with the trolley housing 4. It is thus possible, by corresponding suctioning of fluid, in particular air, through the first cover channel 20, to effect a downward movement of the first end-side wall 40 of the bellows 22 in order to compact or compress the waste receptacle 12 and the waste in the waste receptacle 12. It is furthermore pointed out that, by suctioning of air through the second cover channel 54, an upward movement of the first end-side wall 40 of the bellows 22 can be effected, such that the bellows 22 can be moved back into the folded-in position.

Figure 6:
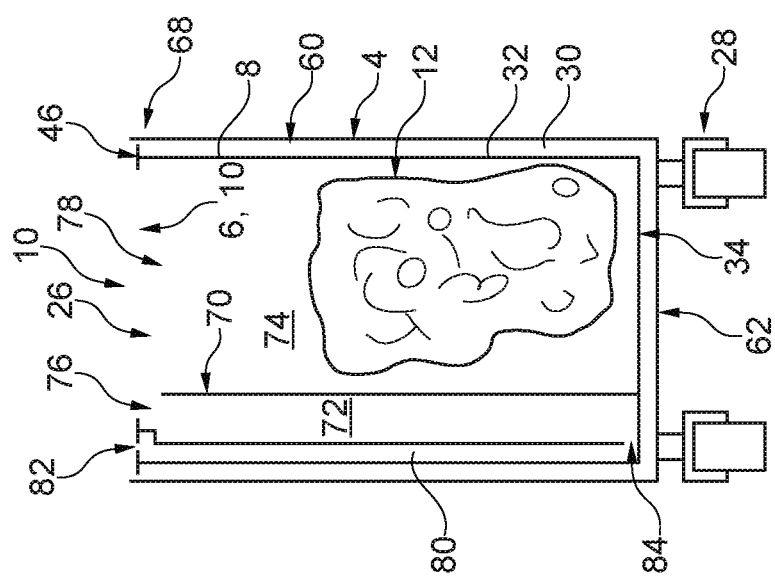

FIG. 6 illustrates a further advantageous configuration of the trolley 2 in a schematic cross-sectional view. Here, the container interior space 26 is divided by means of a partition 70 into a liquids chamber 72 and a solids chamber 74. The liquids chamber 72 serves for accommodating liquid waste. The solids chamber 74 serves for accommodating the waste receptacle 12 and thus for accommodating solid waste. The liquids chamber 72 and the solids chamber 74 extend in each case as far as the container opening 10. Here, the partition 70 may extend from a base 34 of the container 8 as far as the container opening 10. Provision may alternatively be made for the partition 70 to have a recess in a container-opening-side end section, through which recess gas, in particular air, can flow out of the solids chamber 74 into the liquids chamber 72.

Provision is furthermore made for the liquids chamber 72 and the solids chamber 74 to each extend as far as the container opening 10 such that liquid can be conveyed into the liquids chamber 72 through a liquids chamber region 76 of the container opening 10 and such that solids can be conveyed into the solids chamber 74 or into the waste receptacle 12 through a solids chamber opening region 78 of the container opening 10.

Figure 7:
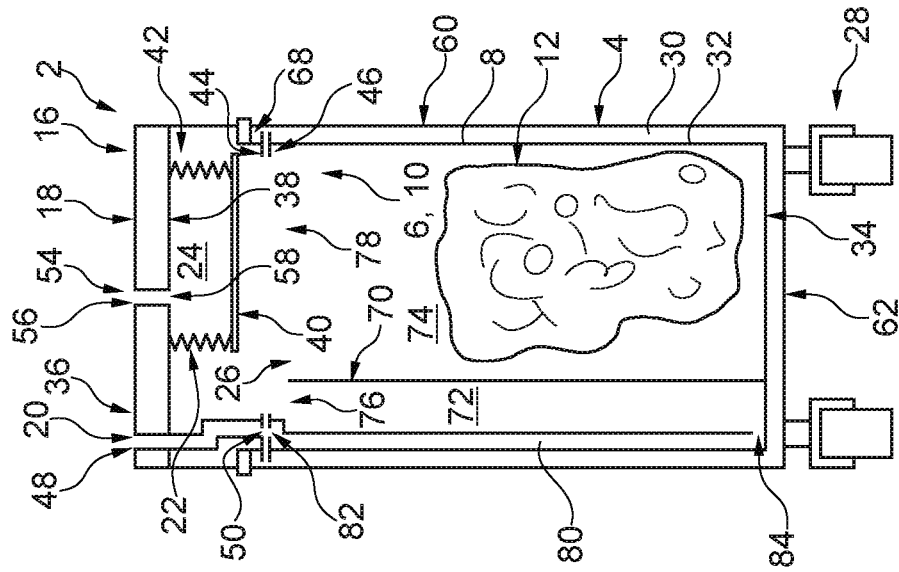

Furthermore, the container has a suction line 80 which extends from a container-opening-side first line opening 82 to a second line opening 84 in a base-side region of the liquids chamber 72. If waste is now collected using the trolley 2, solid waste can be collected in the waste receptacle 12. Liquid waste can be introduced into the liquids chamber 72. If it is now intended to compact the solid waste in the waste receptacle 12, or the waste receptacle 12, the compacting device 16 is mounted onto the trolley housing 4, as is schematically illustrated by way of example in FIG. 7. Provision is made here for the first line opening 82 of the suction line 80 and the second opening 50 of the first cover channel 20 to be arranged such that the second opening 50 of the first cover channel 20 lies at least indirectly in fluid-tight fashion on the first line opening 82. In other words, it is the intention that the first cover channel 20 and the suction line 80 be designed such that a fluidic connection between the first cover channel 20 and the cover channel 80 is formed when the cover 18 of the compacting device 16 is placed in connection with the container 8. If the suctioning of fluid is now performed via the first cover channel 20, the liquid that has been collected in the liquids chamber 72 is firstly suctioned out. This is because the second line opening 84 of the suction line 80 is arranged in the base-side region of the liquids chamber 72. If the liquid has been at least substantially suctioned out of the liquids chamber 72, it is thereupon possible for air to flow out of the solids chamber 74 through the liquids chamber 72 into the line opening 84. The corresponding transfer flow can be ensured by the recess in the partition 70. As can be seen from FIG. 7, it is however also possible for the cover 18 to be designed such that air can flow out of the solids chamber 74 through the intermediate space 52 into the liquids chamber 72. If the suctioning of fluid, that is to say now air, via the first cover channel 20 is continued, a negative pressure is generated in the container interior space 26, and also in the intermediate space 52, which gives rise to the above-discussed action on the first end-side wall 40 of the bellows 22. A force thus acts on the first end-side wall 40 of the bellows 22 in the direction of the waste receptacle 12, such that the bellows 22 moves from the folded-together position into the folded-out position in order to compact or compress the waste receptacle 12 and the waste collected therein.

The above-discussed configuration of the trolley 2 offers the advantage that waste can be collected in a manner separated into liquids and solids, and that the collected liquid firstly takes place by suctioning of fluid via the first cover channel 20, in order for the liquid to preferably be stored separately, and in order for the compaction of the solid waste to then be performed.

Figure 8:
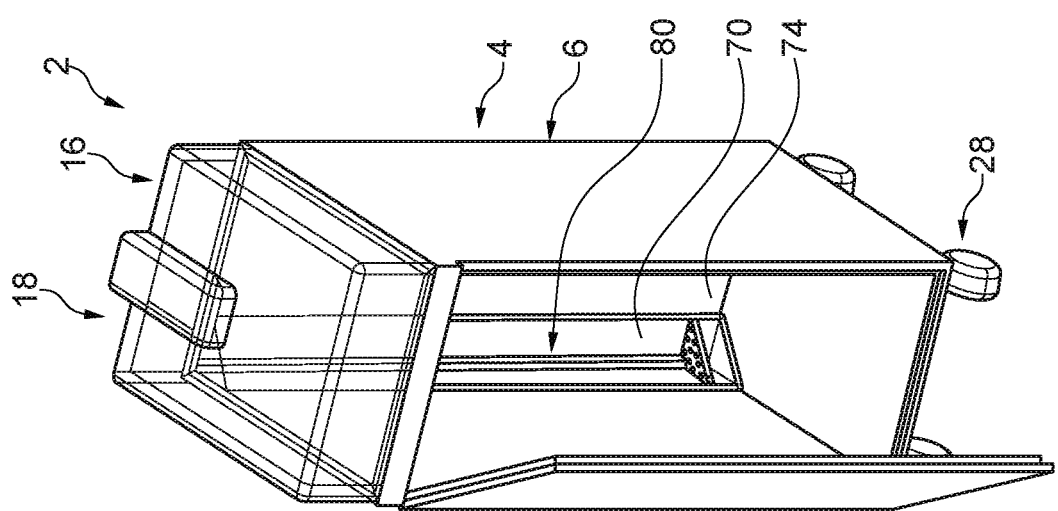
FIG. 8 shows a further exemplary configurations of the trolley in a schematic perspective view.

The configuration of the trolley 2 as has been discussed above in conjunction with FIGS. 6 and 7 is illustrated in FIG. 8 in a schematic perspective view. Here, however, the waste receptacle 12 has not been illustrated. Furthermore, the front-side wall of the container 8 has been omitted in order to provide a view into the container interior space 26 of the container 8. It can be seen from FIG. 8 that the partition 70 preferably extends between two side walls of the container 8.

Figure 9:
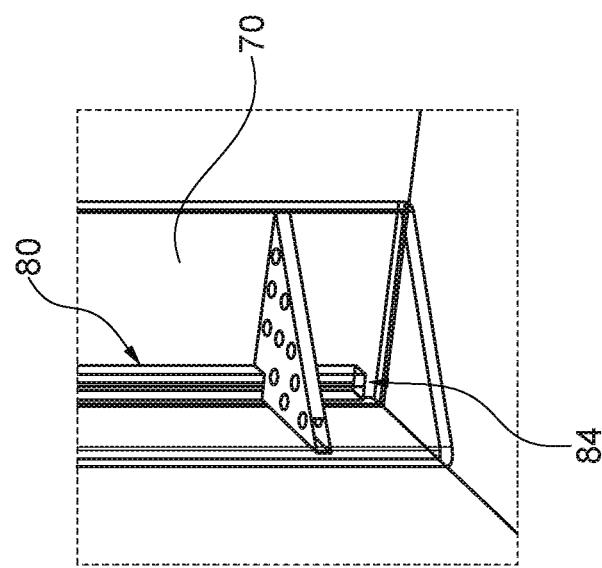
FIG. 9 shows a detail of the trolley from FIG. 8.

FIG. 9 shows a detail of the illustration from FIG. 8. This detail shows, in a semitransparent illustration, the base-side region of the liquids chamber 72. It is clear from FIG. 9 that the suction line 80 may be formed preferably integrally with the container 8, in particular with at least one container wall of the container 8. Furthermore, FIG. 9 shows that the suction line 80 does not extend all the way to the base 34 of the container 8, but is rather spaced apart therefrom. The second line opening 84 may thus be arranged in the direct vicinity of the base of the liquids chamber 72, such that, by suctioning of fluid through the first cover channel 20 and then through the suction line 80, a liquid can be approximately completely suctioned out of the liquids chamber 72. Furthermore, in the liquids chamber 72, in particular in the base-side region of the liquids chamber 72, there may be arranged a screen and/or a wall which extends in a transverse direction and which has passage openings, in order to prevent small solids in the liquid from being able to pass to the second line opening 84 of the suction line 80. This prevents the suction line 80 from becoming blocked.

Figure 10:
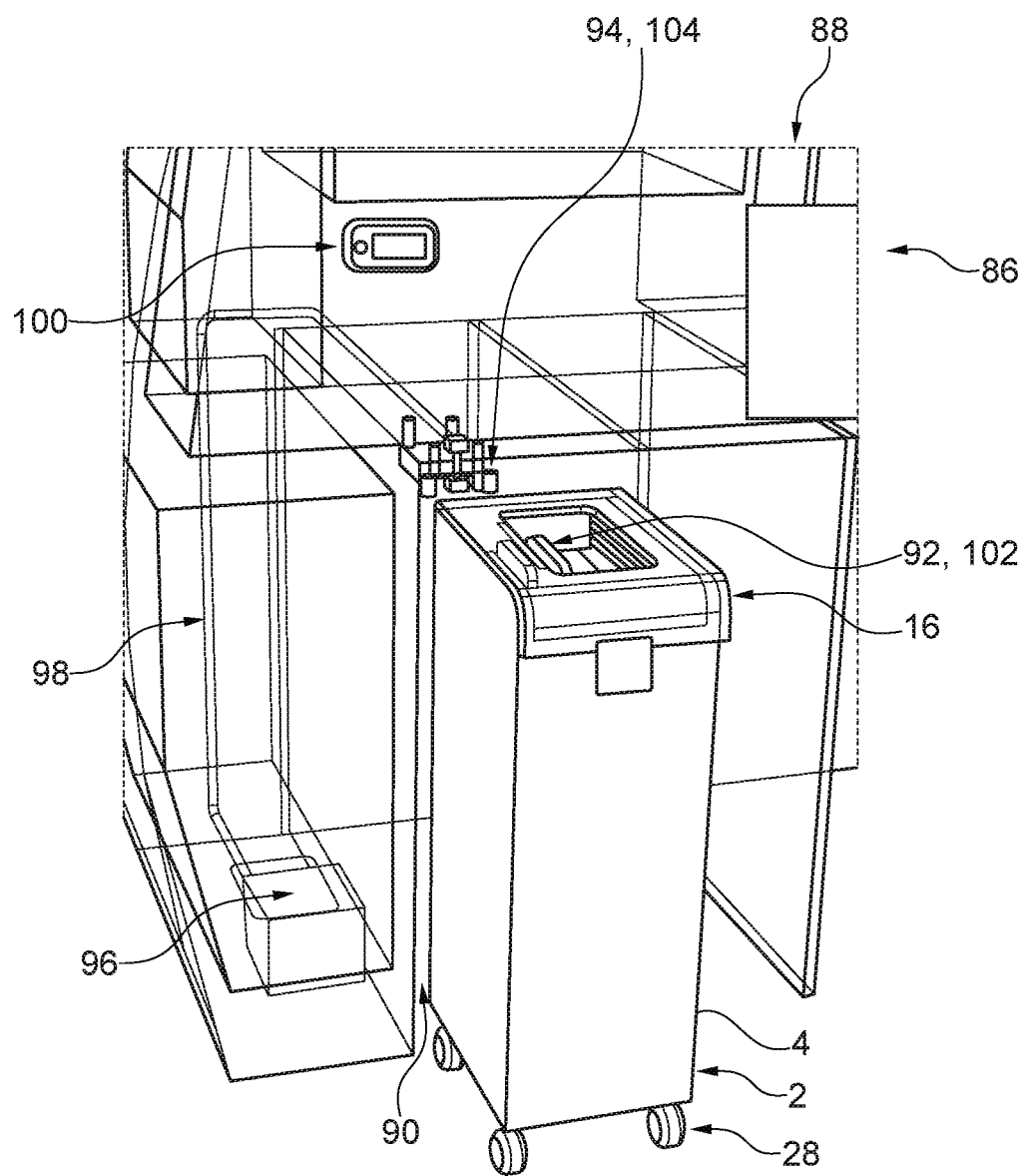
FIGS. 10 to 12 show exemplary configurations of the system in various views.

A system 86 is illustrated in FIG. 10. The system 86 has a trolley 2, as has been discussed above. Furthermore, the system 86 has a cabin monument 88 for a vehicle. The cabin monument 88 has a receiving space 90 for the trolley 2, such that the trolley 2 can be placed in the receiving space 90. For this purpose, the trolley 2 may be pushed into the receiving space 90. Provision is furthermore made for the compacting device 16 of the trolley 2 to have a first coupling connector 92 which is designed to be in fluidic connection with the first cover channel 20. Provision is furthermore made for the cabin monument 88 to have a first coupling counterpart connector 94. The first coupling counterpart connector 94 is designed such that the first coupling connector 92 is detachably couplable to the first coupling counterpart connector 94 in order to produce a fluidic connection between the first coupling connector 92 and the first coupling counterpart connector 94, such that fluid can be suctioned out of the container interior space 26 via the connectors 92, 94. The coupling between the first coupling connector 92 and the first coupling counterpart connector 94 may in this case take place automatically when the trolley 2 is pushed into the receiving space 90. The first coupling connector 92 and the first coupling counterpart connector 94 may be designed and/or arranged correspondingly.

If, after the collecting of waste, the trolley 2 is pushed into the receiving space 90 of the cabin monument, the compaction of the waste receptacle 12 and of the waste collected therein can thereupon take place by virtue of fluid, in particular air, being suctioned out through the first coupling counterpart connector 94. The first coupling counterpart connector 94 may be at least indirectly connected to a vacuum source 96 in order to effect the suctioning of the fluid. Here, the vacuum source 96 is not necessarily a constituent part of the cabin monument 88. The first coupling counterpart connector 94 may be connected to the vacuum source 96 via a fluid line 98, in which a valve is preferably integrated. In order for the vacuum that is provided by the vacuum source 96 to be applied at the first coupling counterpart connector 94, the cabin monument may have an input unit 100, in particular comprising a pushbutton, in order, as a result of actuation of the input unit 10, to generate a signal, on the basis of which the vacuum is applied to the first coupling counterpart connector 94.

One advantageous configuration of the system discussed above, as has been discussed in conjunction with FIG. 10, is preferably characterized in that the compacting device 16 of the trolley 2 has a second coupling connector 102 which is designed to be in fluidic connection with the second cover channel 54, wherein the cabin monument 88 has a second coupling counterpart connector 104 which is designed to be detachably couplable to the second coupling connector 102 in order to produce a fluidic connection between the second coupling connector 102 and the second coupling counterpart connector 104, such that air can be suctioned out of the bellows interior space 24 via the second coupling counterpart connector 104. As has been discussed above in conjunction with the first coupling connector 92 and the first coupling counterpart connector 94, provision is preferably made for the coupling between the second coupling connector 102 and the second coupling counterpart connector 104 to be produced when the trolley is placed or pushed into the receiving space 90. The second coupling counterpart connector 104 may, analogously to the first coupling counterpart connector 94, be at least indirectly connected to the vacuum source 96. By means of this configuration, it is possible for the vacuum of the vacuum source 96 to firstly be applied to the first coupling connector 94, in order to move the bellows 22 from the folded-together position into the folded-out position in order to compact the waste receptacle 12 and the waste situated therein, and in order to thereupon then connect the second coupling connector 102 rather than the first coupling connector 94 at least indirectly to the vacuum source 96 in order to move the bellows 22 from the folded-out position back into the folded-together position again.

Figure 11:
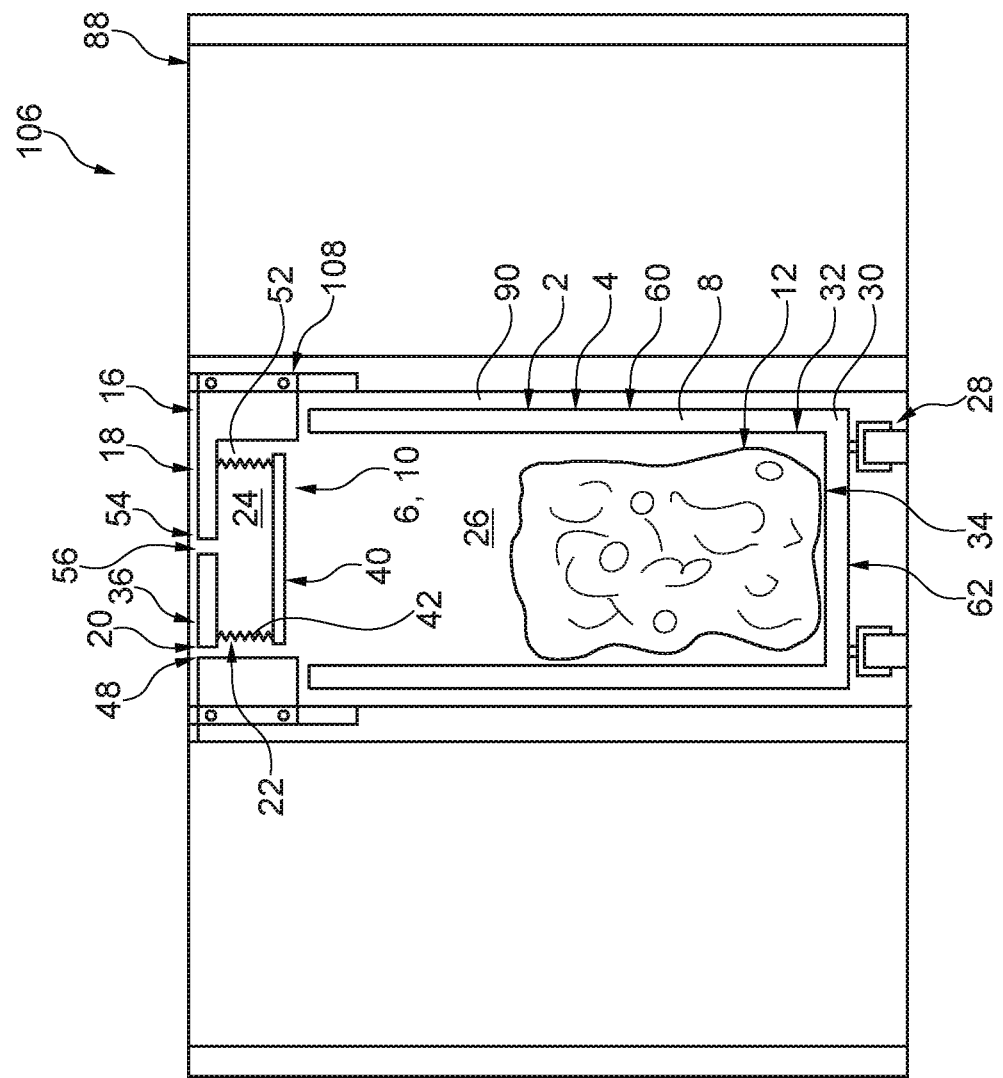

A further system 106 is illustrated in FIG. 11. The system 106 is however not an advantageous configuration of the system as has been discussed above in conjunction with FIG. 10. The system as illustrated in FIG. 11 comprises a trolley 2, as has been discussed by way of example in conjunction with FIGS. 1 to 9, wherein the compacting device 16 is however not assigned to the trolley 2, or the trolley 2 does not have the compacting device 16. Therefore, for the trolley 2 of the system 106, reference is made to the above explanations relating to FIGS. 1 and 9 insofar as they do not relate directly to the compacting device 16 of the trolley 2.

The following explanations relating to the system therefore relate to the system 106 as illustrated by way of example in FIG. 11. The system 106 has a cabin monument 88. The cabin monument 88 serves as a cabin monument for a vehicle, in particular an aircraft. Provision is furthermore made for the cabin monument 88 to have a compacting device 16. The compacting device 16 of the system or of the cabin monument 88 is preferably designed analogously to the already-discussed compacting device 16 of the trolley 2, as has been discussed in conjunction with FIGS. 1 to 9. It can thus be stated that a corresponding compacting device 16 is preferably provided for the system 106 or the cabin monument 88, but that said compacting device is assigned not to the trolley 2 itself but rather to the cabin monument 88.

The cabin monument 88 furthermore has a receiving space 90 for the trolley 2, in which receiving space the trolley 2 can be arranged. For this purpose, the trolley 2 may be placed and/or pushed into the receiving space 90. Furthermore, the compacting device 16 of the cabin monument 88 is specially designed such that the cover 18 with the bellows 22 can be moved in the direction of the trolley 2 when the trolley 2 has been placed in the receiving space 90, such that the cover 18—as already discussed with regard to FIGS. 1 to 9—is placed at least indirectly in connection with the container 8 such that the bellows 22 faces toward a container interior space 26 of the container 8 and that the cover 18 closes off the container interior space 26 in fluid-tight fashion aside from the first cover channel 20, such that fluid can be suctioned out of the container interior space 26 via the first cover channel 20.

The system 106 thus differs in particular by the fact that the compacting device 16 is separate from the trolley 2 and is now arranged in the cabin monument 88. It is nevertheless possible for the same functions and/or effects to be achieved, because the cover 18 with the bellows 22 can be moved in the direction of the trolley housing 4 or of the container 8. For this purpose, the cabin monument 88 may have a linear guide 108 by means of which the compacting device 16 and/or the cover 18 can be moved. By means of the linear guide 108, it is thus possible for the cover 18 to be moved from a first position, in which the cover 18 is spaced apart from the trolley housing, as illustrated by way of example in FIG. 11, into a second position, as illustrated by way of example in FIG. 12, in which the cover 18 is placed at least indirectly in connection with the container 8, such that the cover 18 closes off the container interior space 26 in air-tight fashion aside from the first cover channel 20. It is then possible to realize the compaction and/or the further advantageous processes and/or effects that have been discussed in conjunction with the trolley 2 relating to FIGS. 1 to 9.

Figure 12:
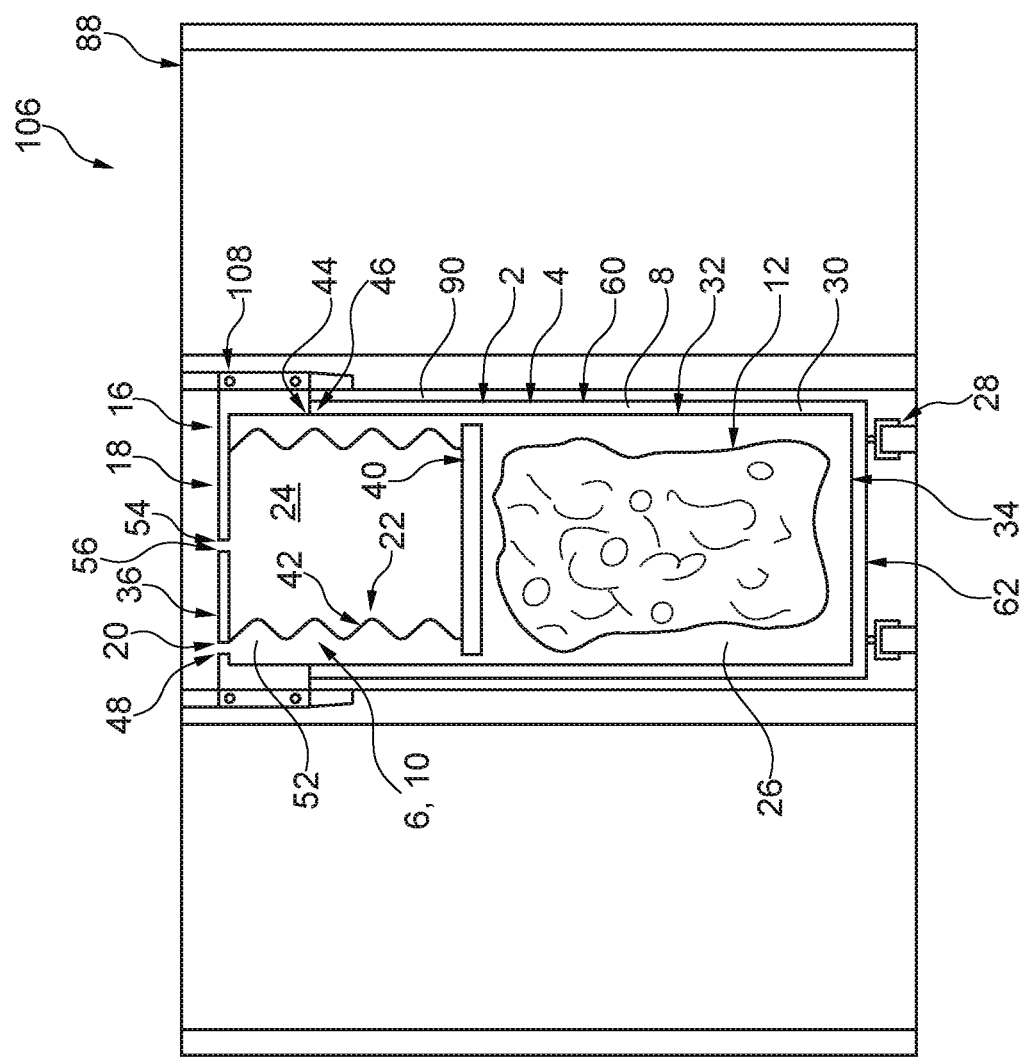

The system 106 discussed in conjunction with FIGS. 11 and 12 offers the advantage that the trolley 2 can be of particularly compact and/or particularly lightweight and therefore also particularly easily handleable design. This is because, during the collection of waste, the trolley 2 can be moved in a manner free from the compacting device 16. For the compaction of the collected waste, the trolley 2 can then be pushed into the receiving space 90 of the cabin monument 88 in order to perform the corresponding compaction.

Figure 13:
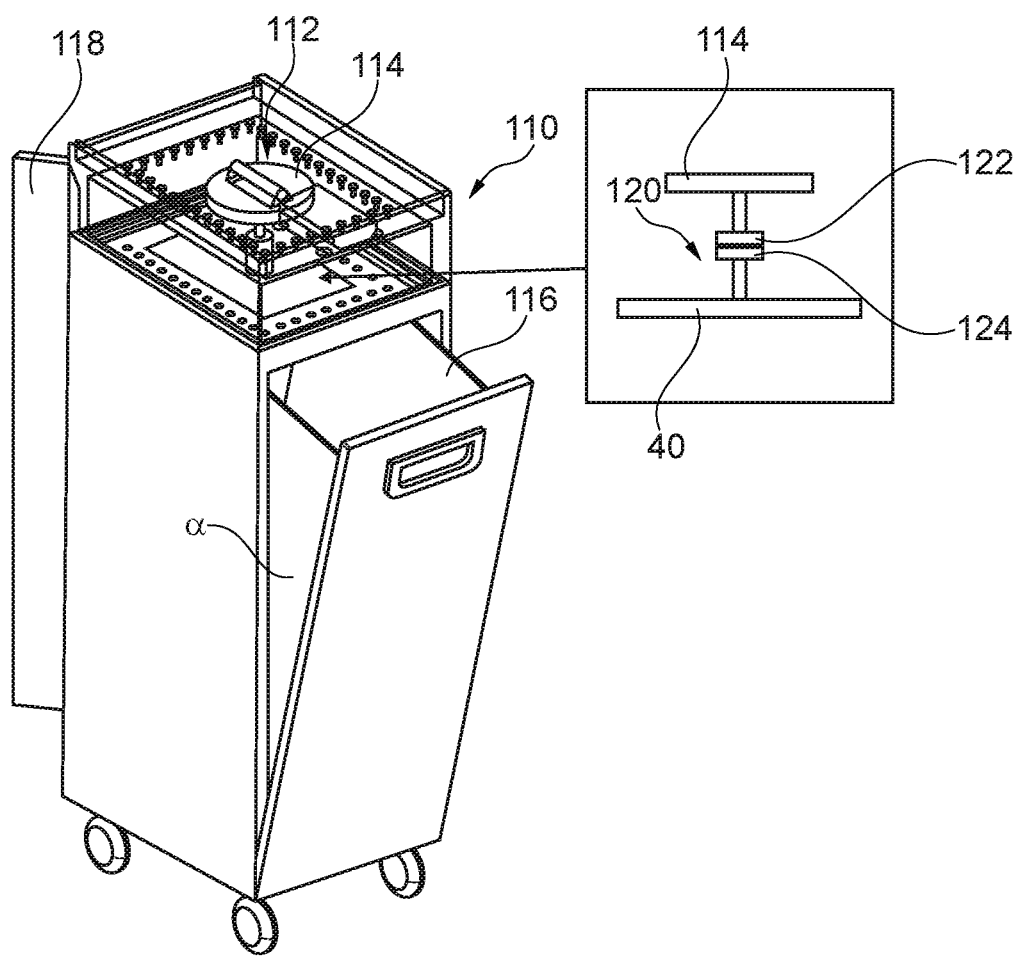

FIG. 13 shows a trolley 110 with a compacting device 16 integrated therein. The trolley 110 has a maintenance opening 112 which can be closed off in air-tight fashion by means of a maintenance flap 114. In the event of a malfunction of the compacting device 16, the maintenance flap 114 can be opened, for example in order to pull the end-side wall 40 of the bellows 22 into an upper position. For this purpose, the wall 40 (not shown here) may have a handle (not shown) which is accessible through the maintenance opening 112. It is self-evident that the maintenance opening 112 should be dimensioned such that a user can pass his or her arm through it.

The trolley 110 moreover has a front door 116 which is for example mounted pivotably at its lower end, which door, by being pivoted into an opened position, makes it possible for waste to be introduced into an interior container (not shown) of the trolley 110. It is expedient for an opening angle α between a vertical and an open position of the front door 116 to be limited to 10° to 15°.

For the exchange of a waste receptacle 12, a rear door 118 may be provided, which is arranged on the trolley housing so as to be pivotable about a vertical axis.

The maintenance cover 114, on which a holding device 120 is arranged, is shown in a schematic side view. By way of example, said holding device has a magnet 122 and a holding plate 124 which is attracted by the magnet 122. When the end-side wall 40 of the bellows 22 is situated in an upper position, the wall 40 is consequently held by the magnet 122, and said wall is released only when a threshold force determined by the magnet 122 acts on the wall 40.

Figure 14A:
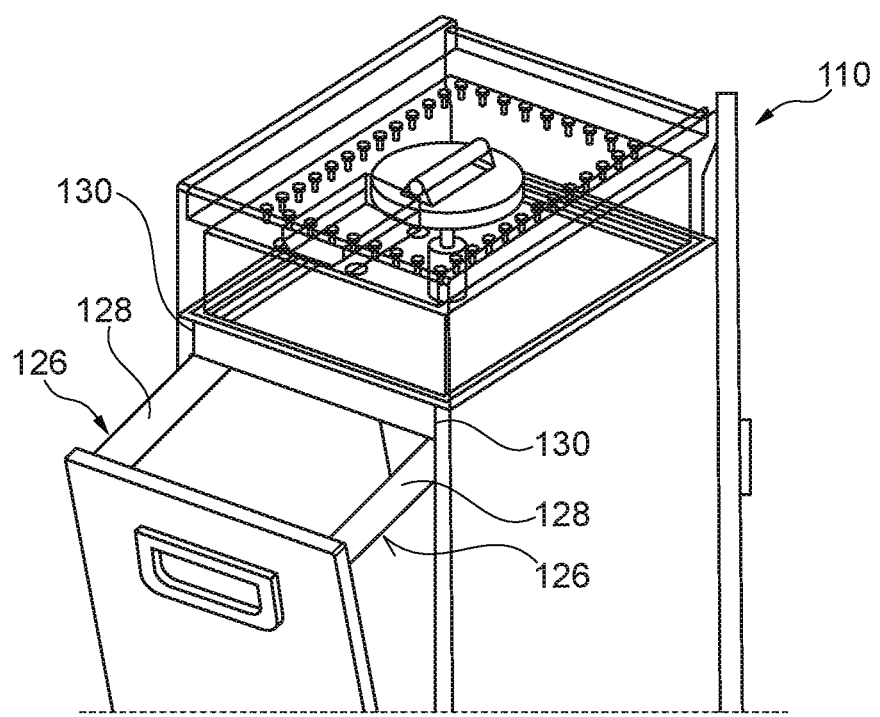

FIG. 14a shows a detail illustration of the front door 116 which, at laterally outer, upper delimiting edges 126, has guide rails 128 or guide rail segments which engage into correspondingly shaped slots 130 of the trolley housing. By beveling of the guide rails 128, the provision of an abutment edge for the end-side wall 40 of the bellows 22 can be prevented, and at the same time precise guidance and centering of the front door 116 can be achieved, whereby, overall, a waste receptacle situated in the trolley 110 can be protected.

FIGS. 14b and 14c likewise show further views of the trolley 110. The rear door 118 may have a further guide rail 130 or a guide rail segment which, analogously to the guide rails 128 of the front door 116, is of beveled design. In this way, as can be seen in FIG. 14c, an abutment edge can be avoided, and the closed position of the front door 116 predefined.

Finally, FIG. 15 shows a cover 132 of the trolley 110, in which cover there are arranged multiple openings 134 via which the bellows interior space is in fluidic connection with the surroundings. Said openings 134 may replace or form the second cover channel.

A connecting channel 136 which connects multiple additional openings 138 directed into the container interior space of the trolley 110 may furthermore be integrated directly into the cover 132 and form or be connected to the first cover channel.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A system for compacting waste, comprising:
   a trolley for collecting waste; and
   a cabin monument for a vehicle;
   wherein the trolley or the cabin monument comprises a compacting device with a cover having a first cover channel;
   the trolley comprising:
      a trolley housing having a top-side housing opening;
      a container having a container opening, the container inserted into the trolley housing and/or at least partially formed by the trolley housing; and
      an exchangeable waste receptacle arranged in the container and having a top-side receptacle opening, wherein the receptacle opening and the container opening are, for the collecting of waste, arranged relative to one another such that waste can be conveyed into a receptacle interior space of the waste receptacle;
   the compacting device comprising a bellows arranged at the bottom side on the cover and movable at least between a folded-together position, in which a bellows interior space of the bellows has a first volume, and a folded-out position, in which the bellows interior space has a second volume which is larger than the first volume;
   wherein the cover is configured to be at least indirectly placed in connection with the container such that the bellows faces toward a container interior space of the container and the cover closes off the container interior space in air-tight fashion aside from the first cover channel, such that fluid can be suctioned out of the container interior space via the first cover channel;
   wherein the bellows is movable into the folded-out position by suctioning of fluid out of the container interior space via the first cover channel, such that the bellows projects into the container interior space to such an extent that the waste receptacle and/or waste in the waste receptacle is compacted, and
   wherein:
      the compacting device is arranged in the trolley and has a first coupling connector configured to be in fluidic connection with the first cover channel; and
      the cabin monument has a first coupling counterpart connector configured to be detachably couplable to the first coupling connector in order to produce a fluidic connection between the first coupling connector and the first coupling counterpart connector, such that fluid can be suctioned out of the container interior space via the first coupling counterpart connector.

2. The system as claimed in claim 1, wherein the first cover channel extends from a first opening at a cover top side of the cover to a second opening at a cover bottom side of the cover, wherein the second opening of the first cover channel is arranged radially to the outside of the bellows.

3. The system as claimed in claim 1, wherein the compacting device is removable and/or is detachably fastened to the trolley housing.

4. The system as claimed in claim 1, wherein the cover and a container-opening-side edge of the container are configured to form an air-tight seal when the cover is mounted onto the edge of the container.

5. The system as claimed in claim 1, wherein an end-side wall, averted from the cover, of the bellows is of rigid form.

6. The system as claimed in the claim 5, wherein a rigid reinforcement plate is arranged and/or formed on the end-side wall of the bellows in order to make the bellows of rigid form at the end-side wall.

7. The system as claimed in claim 1, wherein the cover has a second cover channel configured to be in fluidic connection with the bellows interior space.

8. A system for compacting waste, comprising:
   a trolley for collecting waste; and
   a cabin monument for a vehicle;
   wherein the trolley or the cabin monument comprises a compacting device with a cover having a first cover channel;
   the trolley comprising:
      a trolley housing having a top-side housing opening;
      a container having a container opening, the container inserted into the trolley housing and/or at least partially formed by the trolley housing; and
      an exchangeable waste receptacle arranged in the container and having a top-side receptacle opening, wherein the receptacle opening and the container opening are, for the collecting of waste, arranged relative to one another such that waste can be conveyed into a receptacle interior space of the waste receptacle;
   the compacting device comprising a bellows arranged at the bottom side on the cover and movable at least between a folded-together position, in which a bellows interior space of the bellows has a first volume, and a folded-out position, in which the bellows interior space has a second volume which is larger than the first volume;
   wherein the cover is configured to be at least indirectly placed in connection with the container such that the bellows faces toward a container interior space of the container and the cover closes off the container interior space in air-tight fashion aside from the first cover channel, such that fluid can be suctioned out of the container interior space via the first cover channel;
   wherein the bellows is movable into the folded-out position by suctioning of fluid out of the container interior space via the first cover channel, such that the bellows projects into the container interior space to such an extent that the waste receptacle and/or waste in the waste receptacle is compacted, wherein the first cover channel extends from a first opening at a cover top side of the cover to a second opening at a cover bottom side of the cover, wherein the second opening of the first cover channel is arranged radially to the outside of the bellows, and wherein:
the container interior space is divided by a partition into a liquids chamber and a solids chamber in which the waste receptacle is arranged;
the liquids chamber and solids chamber each extend as far as the container opening such that liquid can be conveyed into the liquids chamber through a liquids chamber opening region of the container opening and such that solids can be conveyed into the solids chamber or the waste receptacle through a solids chamber opening region of the container opening;
the partition has a recess in a container-opening-side end section, through which recess gas can flow out of the solids chamber into the liquids chamber;
the container has a suction line which extends from a container-opening-side first line opening to a second line opening in a base-side region of the liquids chamber; and
the first line opening of the suction line and the second opening of the first cover channel are arranged such that the second opening of the first cover channel lies at least indirectly in fluid-tight fashion on the first line opening when the cover is placed in connection with the container, such that a fluidic connection is formed between the first cover channel and the suction line.

9. The system as claimed in claim 1, wherein:
the cabin monument comprises the compacting device, under which there is arranged a receiving space for the trolley, such that the trolley can be placed in the receiving space;
the compacting device is configured to move the cover with the bellows in the direction of the trolley when the trolley has been placed in the receiving space, such that the cover is at least indirectly placed in connection with the container such that the bellows faces toward a container interior space of the container and the cover closes off the container interior space in air-tight fashion aside from the first cover channel, such that fluid can be suctioned out of the container interior space via the first cover channel.

10. The system as claimed in claim 7, wherein:
the compacting device of the trolley has a second coupling connector configured to be in fluidic connection with the second cover channel; and
the cabin monument has a second coupling counterpart connector configured to be detachably couplable to the second coupling connector in order to produce a fluidic connection between the second coupling connector and the second coupling counterpart connector, such that air can be suctioned out of the bellows interior space via the second coupling counterpart connector.

11. A system for compacting waste, comprising:
a trolley for collecting waste; and
a cabin monument for a vehicle;
wherein the trolley or the cabin monument comprises a compacting device with a cover having a first cover channel and a second cover channel;
the trolley comprising:
a trolley housing having a top-side housing opening;
a container having a container opening, the container inserted into the trolley housing and/or at least partially formed by the trolley housing; and
an exchangeable waste receptacle arranged in the container and having a top-side receptacle opening, wherein the receptacle opening and the container opening are, for the collecting of waste, arranged relative to one another such that waste can be conveyed into a receptacle interior space of the waste receptacle;
the compacting device comprising a bellows arranged at the bottom side on the cover and movable at least between a folded-together position, in which a bellows interior space of the bellows has a first volume, and a folded-out position, in which the bellows interior space has a second volume which is larger than the first volume;
wherein the cover is configured to be at least indirectly placed in connection with the container such that the bellows faces toward a container interior space of the container and the cover closes off the container interior space in air-tight fashion aside from the first cover channel, such that fluid can be suctioned out of the container interior space via the first cover channel;
wherein the bellows is movable into the folded-out position by suctioning of fluid out of the container interior space via the first cover channel, such that the bellows projects into the container interior space to such an extent that the waste receptacle and/or waste in the waste receptacle is compacted,
wherein the first cover channel extends from a first opening at a cover top side of the cover to a second opening at a cover bottom side of the cover, wherein the second opening of the first cover channel is arranged radially to the outside of the bellows,
wherein:
the compacting device is arranged in the trolley and has a first coupling connector configured to be in fluidic connection with the first cover channel; and
the cabin monument has a first coupling counterpart connector configured to be detachably couplable to the first coupling connector in order to produce a fluidic connection between the first coupling connector and the first coupling counterpart connector, such that fluid can be suctioned out of the container interior space via the first coupling counterpart connector wherein:
the compacting device of the trolley has a second coupling connector configured to be in fluidic connection with the second cover channel; and
the cabin monument has a second coupling counterpart connector configured to be detachably couplable to the second coupling connector in order to produce a fluidic connection between the second coupling connector and the second coupling counterpart connector, such that air can be suctioned out of the bellows interior space via the second coupling counterpart connector, and wherein:
the cabin monument has a controllable multi-way valve;
a first inlet of the multi-way valve is at least indirectly couplable to a vacuum source;
a first outlet of the multi-way valve is configured to be in fluidic connection with the first cover channel or with the first coupling counterpart connector;

a second outlet of the multi-way valve is configured to be in fluidic connection with the second cover channel or with the second coupling counterpart connector; and the multi-way valve is controllable to suction fluid out of either the bellows interior space or the container interior space by means of the vacuum source, such that the bellows is moved between the folded-together position and the folded-out position, or vice versa.

12. The system as claimed in claim 11, wherein:
the multi-way valve has a second inlet which is at least indirectly coupled to ambient air; and
the multi-way valve is at least controllable such that the first inlet is coupled to the first outlet and the second inlet is coupled to the second outlet, or such that the first inlet is coupled to the second outlet and the second inlet is coupled to the first outlet.

13. The system as claimed in claim 5, wherein the compacting device comprises a holding device with which the end-side wall of the bellows can be placed in connection in order to hold the end-side wall in an upper position until, during the initiation of a compacting operation, a minimum force acts on the end-side wall and releases the latter from the holding device.

* * * * *